US006960857B2

(12) United States Patent
Oohashi et al.

(10) Patent No.: US 6,960,857 B2
(45) Date of Patent: Nov. 1, 2005

(54) STATOR FOR AN ALTERNATOR AND METHOD FOR THE MANUFACTURE THEREOF

(75) Inventors: Atsushi Oohashi, Tokyo (JP); Yoshihito Asao, Tokyo (JP); Takushi Takizawa, Tokyo (JP); Yukiyoshi Ohnishi, Tokyo (JP); Hiroshi Hosokawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 288 days.

(21) Appl. No.: 10/228,293

(22) Filed: Aug. 27, 2002

(65) Prior Publication Data

US 2004/0207283 A1 Oct. 21, 2004

(30) Foreign Application Priority Data

Sep. 17, 2001 (JP) ........................................ 2001-281347

(51) Int. Cl.⁷ ............................................... H02K 3/12
(52) U.S. Cl. ....................... 310/179; 310/198; 310/201; 310/207

(58) Field of Search .................................. 310/179, 180, 310/184, 198, 207, 208, 201

(56) References Cited

U.S. PATENT DOCUMENTS

| 3,453,468 | A | * | 7/1969 | Lund ........................... 310/180 |
| 3,735,169 | A | * | 5/1973 | Balke et al. ................. 310/214 |
| 6,049,154 | A | * | 4/2000 | Asao et al. .................. 310/201 |
| 6,137,201 | A | * | 10/2000 | Umeda et al. ............... 310/179 |

FOREIGN PATENT DOCUMENTS

JP          63-194543          8/1988

\* cited by examiner

*Primary Examiner*—Darren Schuberg
*Assistant Examiner*—David W. Scheuermann
(74) *Attorney, Agent, or Firm*—Sughrue Mion, PLLC

(57) ABSTRACT

A stator winding is provided with three distributed winding phase portions each constructed by installing a conductor wire in every third slot. Slot-housed portions of the conductor wires are formed with a rectangular cross section and coil end portions are formed with a circular cross section.

8 Claims, 18 Drawing Sheets

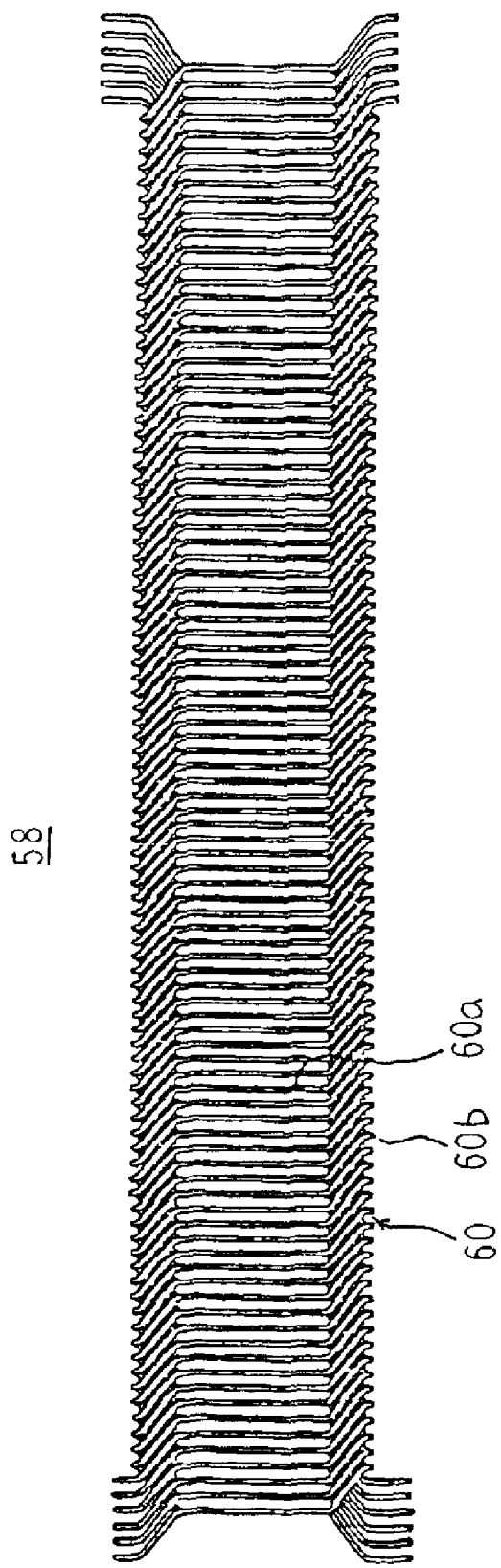

STATOR FOR AN ALTERNATOR AND METHOD FOR THE MANUFACTURE THEREOF

BACKGROUND OF THE INVENTION

1. Field of the Invention

The present invention relates to an alternator, and particularly to a stator for an alternator mounted to an automobile, etc., enabling reductions in size and increased output, and to a method for the manufacture thereof.

2. Description of the Related Art

A conventional stator for an alternator is prepared by installing conductor wires having a circular cross section in slots of a stator core, then pressing the conductor wires housed inside the slots in a slot depth direction, and then making the slot openings half-open by flaring the tips of the tooth portions of the stator core to first and second circumferential sides.

However, one problem has been that improvements in the output of the alternator cannot be achieved when conductor wires having a circular cross section are housed inside the slots because the space factor (the ratio occupied by the conductor wires in the slots) cannot be improved due to space inevitably arising between the conductor wires.

When conductor wires having a circular cross section are installed in the slots, the conductor wires cross each other inside the slots, and the conductor wires are not housed in an aligned state inside the slots. If conductor wires housed in this state are pressed in a slot depth direction, an electrically-insulating coating on the surface of the conductor wires is damaged, giving rise to short-circuiting among the conductor wires. As a result, another problem has been that the rate of production of the stator declines.

In order to solve problems of this kind, a stator for an alternator is proposed in Japanese Patent Non-Examined Laid-Open No. SHO 63-194543, for example, which is prepared by preparing winding portions by winding conductor wires having a circular cross section for a predetermined number of winds, press forming portions of the conductor wires of these winding portions to be housed in the slots into a quadrangular cross section, and then installing the winding portions in the stator core such that the portions of the conductor wires formed with the quadrangular cross section are inserted into the slots.

FIG. 23 is a partial cross section showing a conventional stator for an alternator described in Japanese Patent Non-Examined Laid-Open No. SHO 63-194543, for example, FIGS. 24 to 26 are all diagrams explaining a method for forming a stator winding in the conventional stator for an alternator, FIG. 27 is a perspective showing part of a stator core before installation of the stator winding in the conventional stator for an alternator, and FIGS. 28A and 28B are diagrams explaining a method for forming flange portions of the stator core in the conventional stator for an alternator.

A conventional stator 1 for an alternator, as shown in FIG. 23, includes: a stator core 2; and a stator winding 4 installed in the stator core 2.

The stator core 2 is prepared by laminating a predetermined number of steel sheets punched into a predetermined shape, being constructed such that tooth portions 7 disposed so as to extend radially inward from an annular core back portion 6 are arranged at a predetermined pitch in a circumferential direction. Slots 3 are defined between adjacent pairs of the tooth portions 7. Flange portions 5 are formed on tip portions of each of the tooth portions 7 so as to project toward first and second circumferential sides. These flange portions 5 serve a function of collecting magnetic flux, and also serve a function of preventing popping out of the stator winding 4 by closing approximately half a width of the openings of the slots 3.

The stator winding 4 is installed in the stator core 2 such that three-phase output can be obtained. In each of the slots 3, as described below, slot-housed portions 12a formed by press-deforming a portion of conductor wires 11 having a circular cross section into a rectangular cross section are housed so as to line up in single rows in a radial direction.

Furthermore, insulators 8 having high heat-tolerance are mounted into each of the slots 3, ensuring electrical insulation between the stator core 2 and the stator winding 4.

A method for forming the stator winding 4 will now be explained.

First, as shown in FIG. 24, a lap winding 10 having a plurality of rectangular winding portions 12 is prepared by forming a first rectangular winding portion 12 by winding one conductor wire 11 having a circular cross section into a substantially rectangular shape for a predetermined number of winds (six winds, for example), and then winding the conductor wire 11 projecting from this rectangular winding portion 12 for a predetermined number of winds so as to form a second rectangular winding portion 12, and so on.

Next, each of the rectangular winding portions 12 of the lap winding 10 are mounted onto a press forming machine 13, as shown in FIG. 25. Here, the slot-housed portions 12a are superposed in single rows and inserted between a stopper 15 and slides 14 slidably supported by springs 16. Then, the slot-housed portions 12a are pressed in the direction of the arrow by a pusher 17. Hence, as shown in FIG. 26, the slot-housed portions 12a of the lap winding 10 are formed with a rectangular cross section. Moreover, coil end portions 12b linking the slot-housed portions 12a have a circular cross section.

The slot-housed portions 12a of the lap winding 10 constructed in this manner are inserted from an inner circumferential side into each of the slots 3 of the stator core 2 shown in FIG. 27. Here, the lap winding 10 is installed in the stator core 2 by inserting the slot-housed portions 12a into every third slot 3. As shown in FIG. 28A, the insulators 8 are mounted in each of the slots 3 and the slot-housed portions 12a are housed in six layers so as to line up in single rows in a radial direction. The stator winding 4 is constructed by installing three lap windings 10 in the stator core 2 such that the slots 3 into which the slot-housed portions 12a of each lap winding 10 are inserted are offset by one slot each.

Next, tip surfaces of the tooth portions 7 of the stator core 2 are pressed by a roller, etc., (not shown) in directions indicated by the arrows F in FIG. 28B. Hence, penetrating apertures 9 formed on the tip portions of the tooth portions 7 are crushed, and portions on first and second circumferential sides of the penetrating apertures 9 are pushed circumferentially outward, forming the flange portions 5.

In this conventional stator 1, the slot-housed portions 12a having a rectangular cross section are housed in six layers in each of the slots 3 so as to line up in single rows in a radial direction. Bundles of six coil end portions 12b of each of the lap windings 10 leading out from any given slot 3 and leading into the next slot 3 three slots away in a first circumferential direction are each arranged at a pitch of six slots in a circumferential direction, constituting coil end groups. In these coil end groups, the maximum radial overlap of the bundles of coil end portions 12b is three bundles.

In the conventional stator 1 constructed in this manner, because the slot-housed portions 12a of the lap winding 10 are formed with a rectangular cross section before being inserted into the slots 3, gaps are less likely to arise between the slot-housed portions 12a housed inside the slots 3. As a result, the space factor is improved, enabling improvements in the output of the alternator.

Because the press forming machine 13 is used to press deform the slot-housed portions 12a of the rectangular winding portions 12 of the lap winding 10 into a rectangular cross section after forming the lap winding 10 using one conductor wire 11, the slot-housed portions 12a can be set between the slides 14 and the stopper 15 in an aligned state, enabling the occurrence of damage to the electrically-insulating coating of the conductor wires 11 resulting from press deformation to be suppressed. As a result, the occurrence of short-circuiting among the conductor wires 11 is suppressed, enabling reductions in the rate of production of the stator 1 to be prevented.

Because the coil end portions 12b have a circular cross section, the occurrence of damage to the electrically-insulating coating resulting from rubbing among the coil end portions 12b is suppressed, improving electrical insulation.

Because the conventional stator 1 for an alternator is constructed by installing three lap windings 10 in the stator core 2 such that the slots 3 into which the slot-housed portions 12a of each lap winding 10 are inserted are offset by one slot each, a maximum of three bundles of six coil end portions 12b overlap in a radial direction at the axial ends of the stator core 2. Thus, large bending stresses resulting from contact between the bundles of coil end portions 12b act on the coil end portions 12b. These bending stresses are concentrated at the boundary between the slot-housed portions 12a and the coil end portions 12b and one problem has been that the electrically-insulating coating at the boundary is damaged, giving rise to incidents of short-circuiting among the conductor wires 11.

In the method for manufacturing the conventional stator 1 for an alternator, because the slot-housed portions 12a of the lap winding 10 are inserted into each of the slots 3 of the stator core 2 from an inner circumferential side and then the flange portions 5 projecting from the first and second circumferential sides are formed by pressing the tip surfaces of the tooth portions 7 from an inner circumferential side and plastically deforming the tip portions of the tooth portions 7, irregularities arise in the shape of the flange portions 5. As a result, another problem has been that when the stator 1 is mounted to an alternator, the magnetic circuit becomes unbalanced, leading to aggravation of electromagnetic noise.

SUMMARY OF THE INVENTION

The present invention aims to solve the above problems and an object of the present invention is to provide a stator for an alternator and a method for the manufacture thereof enabling incidents of short-circuiting among conductor wires to be reduced by constructing a stator winding using distributed windings to distribute coil end portions projecting from any given slot to first and second circumferential sides, and reducing the number of coil end portions linking slot-housed portions in slot pairs to reduce bending stresses resulting from contact between bundles of the coil end portions, thereby suppressing the occurrence of damage to an electrically-insulating coating on the conductor wires.

Another object of the present invention is to provide a method for manufacturing a stator for an alternator enabling aggravation of electromagnetic noise when mounted to the alternator to be reduced by inserting the slot-housed portions of the stator winding into slots of a stator core from an axial direction and also enabling flange portions to be formed integrally on tips of tooth portions by press punching during formation of the stator core.

With the above object in view, a stator for an alternator of the present invention includes a stator core composed of an annular core back portion, tooth portions each projecting radially inward from the core back portion, the tooth portions being disposed at a predetermined pitch in a circumferential direction, slots defined by adjacent pairs of the tooth portions, and flange portions projecting to first and second circumferential sides from tip portions of the tooth portions; and stator winding composed of a plurality of winding phase portions each installed in the stator core in a slot group constituted by a group of the slots disposed at intervals of a predetermined number of slots. Each of the winding phase portions is constructed by installing a conductor wire in a distributed winding in the slot group so as to project from first and second ends of the slots, be distributed on first and second circumferential sides, and enter each of the slots the predetermined number of slots away on the first and second circumferential sides. Each of slot-housed portions of the conductor wire housed in the slots is formed with a flat cross section. Each of coil end portions of the conductor wire linking end portions of the slot-housed portions is formed with a substantially circular cross section. The slot-housed portions are housed inside each of the slots in a plurality of layers so as to be arranged in at least a single row in a radial direction.

Therefore, the space factor is improved, thereby enabling an alternator having high output to be achieved. Further, the occurrence of damage to the electrically-insulating coating resulting from rubbing among the coil end portions is suppressed and the occurrence of damage to the electrically-insulating coating resulting from bending stresses arising due to contact among the coil end portions is suppressed, thereby providing a stator for an alternator having superior electrical insulation.

With the above object in view, a method for manufacturing a stator for an alternator of the present invention includes the steps of preparing the stator core by laminating and integrating a magnetic steel sheet, preparing an annular winding unit by winding a conductor wire formed with a substantially circular cross section into a ring shape for a predetermined number of winds, and preparing a star-shaped winding unit by bending the annular winding unit into a star-shaped pattern. In the star-shaped pattern, straight slot-housed portions are arranged at a predetermined slot pitch in a circumferential direction with a longitudinal direction thereof substantially aligned in a radial direction, end portions of slot-housed portions separated by the predetermined slot pitch in approximately half of the slot-housed portions are alternately linked on an inner circumferential side and an outer circumferential side by first U-shaped coil end portions, end portions of slot-housed portions separated by the predetermined slot pitch in a remainder of the slot-housed portions are alternately linked on an inner circumferential side and an outer circumferential side by second U-shaped coil end portions, and the first coil end portions linking the end portions of approximately half of the slot-housed portions and the second coil end portions linking the end portions of the remainder of the slot-housed portions face each other in a radial direction. Further, the method includes the steps of plastically deforming the slot-housed portions of the star-shaped winding unit into a flat cross section, preparing a cylindrical distributed winding unit by reshaping the star-shaped winding unit such that the slot-housed portions are arranged at the predetermined slot pitch in a circumferential direction with a longitudinal direction thereof parallel to an axial direction, and mounting the distributed winding unit into the stator core from an axial direction by inserting the slot-housed portions inside the slots while passing a portion of the coil end portions at a first axial end of the distributed winding unit between the flange portions constituting slot openings.

Therefore, a stator having a high space factor and superior electrical insulation can be manufactured. Further, a stator enabling the shape of the tips of the tooth portions to be formed with high dimension precision can be manufactured.

BRIEF DESCRIPTION OF THE DRAWINGS

FIG. 20 is a side elevation showing the winding assembly used in the stator winding of the stator for an automotive alternator according to Embodiment 5 of the present invention;

DETAILED DESCRIPTION OF THE PREFERRED EMBODIMENTS

The preferred embodiments of the present invention will now be explained with reference to the drawings.

Embodiment 1

Figure 1:
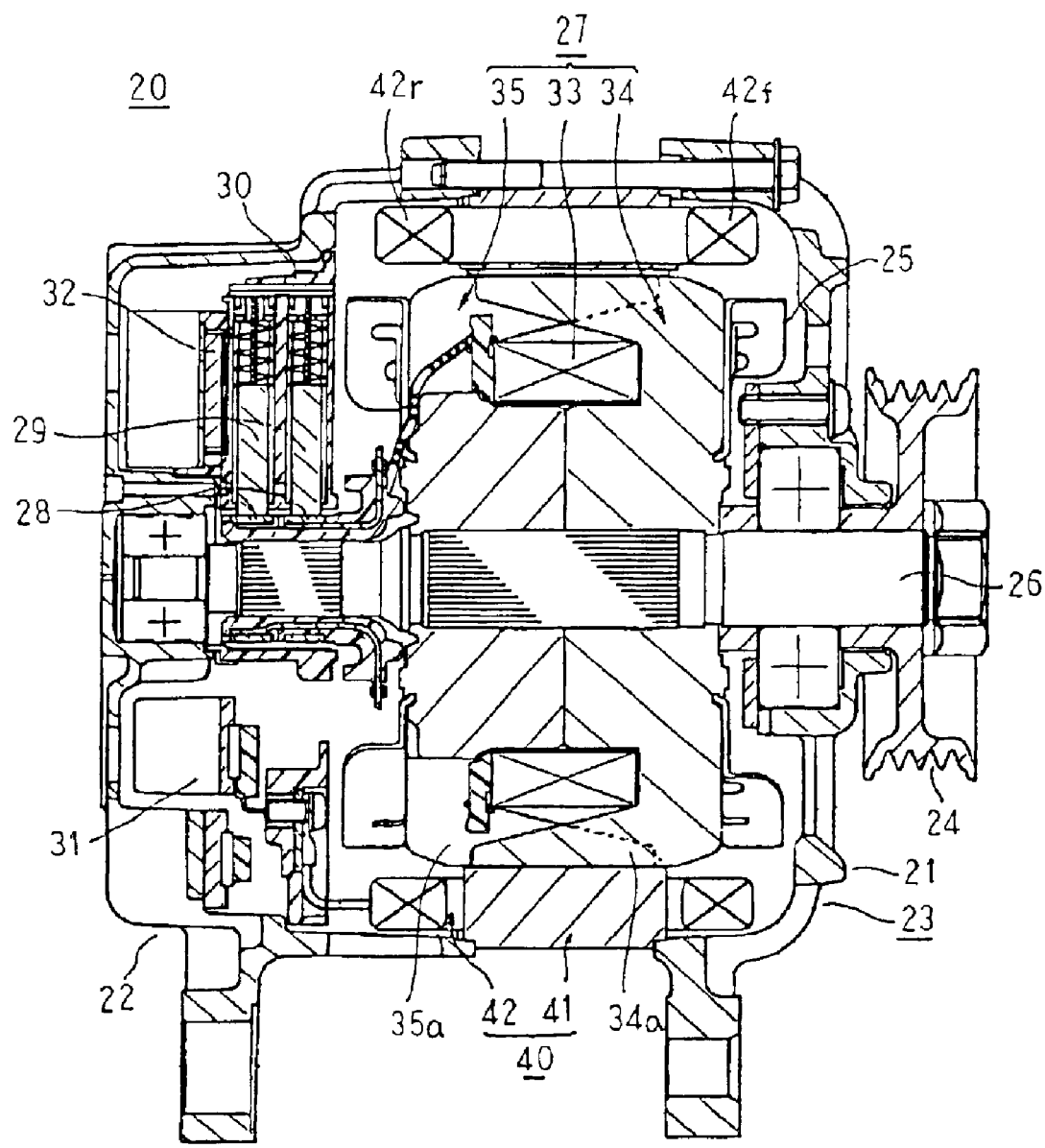
FIG. 1 is a longitudinal section showing an automotive alternator mounted with a stator according to Embodiment 1 of the present invention.
Figure 2:
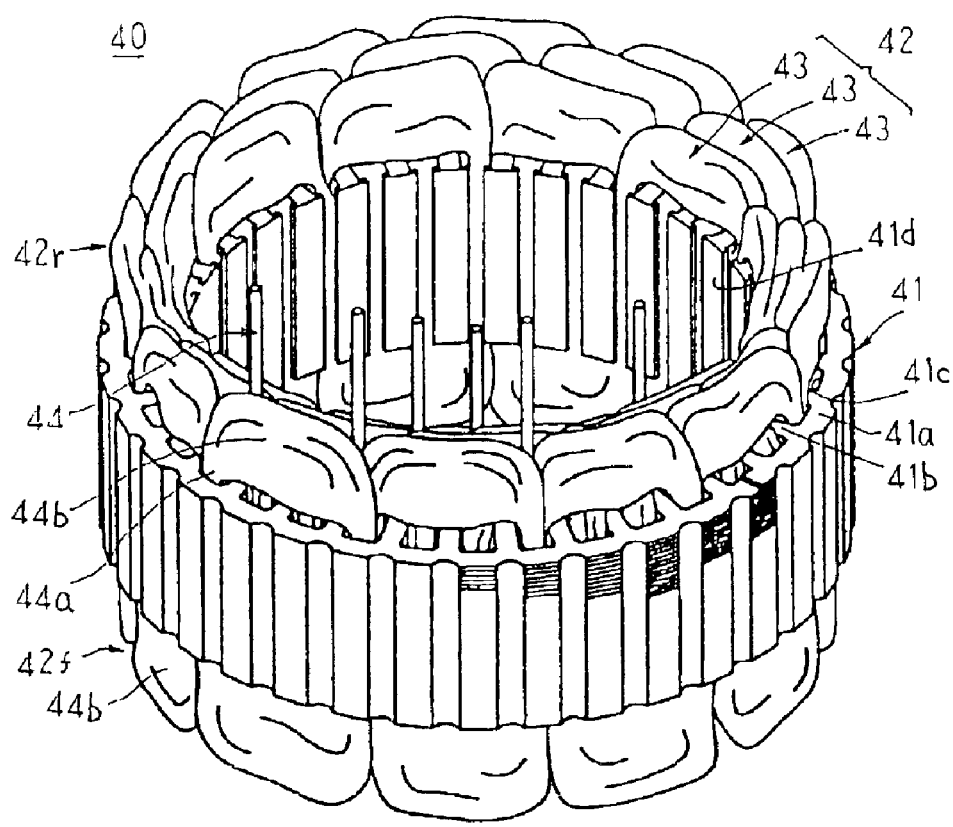
FIG. 2 is a perspective showing the stator for an automotive alternator according to Embodiment 1 of the present invention.
Figure 3:
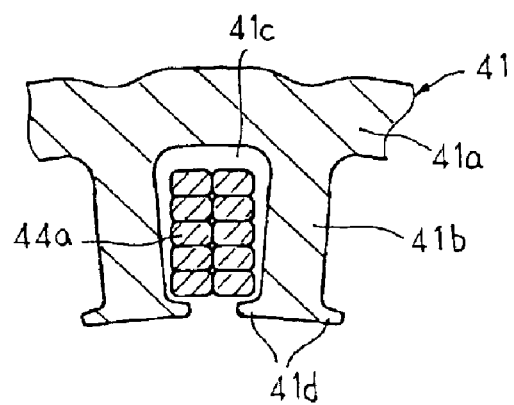
FIG. 3 is a partial cross section showing a slot-housed state of a stator winding in the stator for an automotive alternator according to Embodiment 1 of the present invention.

FIG. 1 is a longitudinal section showing an automotive alternator mounted with a stator according to Embodiment 1 of the present invention, FIG. 2 is a perspective showing the stator for an automotive alternator according to Embodiment 1 of the present invention, and FIG. 3 is a partial cross section showing a slot-housed state of a stator winding in the stator for an automotive alternator according to Embodiment 1 of the present invention.

As shown in FIG. 1, an automotive alternator 20 includes: a housing 23 constituted by a front bracket 21 and a rear bracket 22 made of aluminum, each being substantially cup-shaped; a shaft 6 disposed inside the housing 23; a pulley 24 being secured to a first end portion of the shaft 26; a Lundell-type rotor 27 secured to the shaft 26; fans 25 secured to first and second axial end portions of the rotor 27; a stator 40 secured to the housing 23 so as to envelop the rotor 27; slip rings 28 secured to a second end portion of the shaft 26 for supplying electric current to the rotor 27; a pair of brushes 29 sliding on surfaces of the slip rings 28; a brush holder 30 accommodating the brushes 29; a rectifier 31 electrically connected to the stator 40 for converting alternating current generated in the stator 40 into direct current; and a regulator 32 fitted onto the brush holder 30, the regulator 32 adjusting the magnitude of the alternating voltage generated in the stator 40.

The rotor 27 includes: a field winding 33 for generating magnetic flux on passage of an electric current; and a pair of first and second pole cores 34 and 35 disposed so as to cover the field winding 33, magnetic poles being formed in the first and second pole cores 34 and 35 by the magnetic flux from the field winding 33. The first and second pole cores 34 and 35 are made of iron, each has a plurality of first and second claw-shaped magnetic poles 34a and 35a having a substantially trapezoidal outermost diameter surface shape disposed on an outer circumferential edge portion at even angular pitch in a circumferential direction so as to project axially, and the first and second pole cores 34 and 35 are fixed to the shaft 26 facing each other such that the first and second claw-shaped magnetic poles 34a and 35a intermesh.

The stator 40 is constituted by: a cylindrical stator core 41 formed by laminating a magnetic steel sheet; and a stator winding 42 installed in the stator core 41. The stator 40 is held between the front bracket 21 and the rear bracket 22 so as to form a uniform air gap between outer circumferential surfaces of the claw-shaped magnetic poles 34a and 35a and an inner circumferential surface of the stator core 41.

Next, a construction of the stator 40 will be explained with reference to FIGS. 2 and 3.

The stator core 41 is prepared into a cylindrical shape by laminating and integrating a magnetic steel sheet into a predetermined shape, the stator core 41 having: an annular core back portion 41a; tooth portions 41b each projecting radially inward from the core back portion 41a, the tooth portions 41b being disposed at a predetermined pitch in a circumferential direction; slots 41c defined by adjacent pairs of the tooth portions 41b; and flange portions 41d projecting outward to first and second circumferential sides from tip portions of the tooth portions 41b. Here, the slots 41c are formed at a ratio of one per phase per pole at an even angular pitch in a circumferential direction. In other words, for twelve claw-shaped magnetic poles 34a and 35a in the rotor 27, thirty-six slots 41c are disposed in the stator core 41 to obtain the stator winding 42, which is composed of one three-phase alternating-current winding. Furthermore, because each of the tooth portions 41b is formed with a rectangular cross section, the slots 41c defined by adjacent pairs of the tooth portions 41b are formed with a substantially trapezoidal shape tapering radially inward.

The stator winding 42 is provided with three distributed winding phase portions 43 mounted to the stator core 41 such that the slots 41c in which each distributed winding phase portion 43 is mounted are offset by one slot. The three-phase alternating-current winding is constructed by forming the three distributed winding phase portions 43 into an alternating-current connection, such as a Y connection, for example.

Each of the distributed winding phase portions 43 is constructed by winding one conductor wire 44 composed of a copper wire material covered with an electrically-insulating coating into a wave shape in every third slot 41c for five turns in a first circumferential direction and then continuing to wind the conductor wire 44 into a wave shape in every third slot 41c for five turns in a second circumferential direction. Portions of the conductor wires 44 housed inside the slots 41c (hereinafter called "slot-housed portions 44a") are formed with a rectangular cross section, and portions of the conductor wires 44 linking slot-housed portions 44a housed in slots 41c three slots apart at axial ends of the stator core 41 (hereinafter called "coil end portions 44b") are formed with a circular cross section. Here, the length of the long sides of the rectangular cross section of the slot-housed portions 44a is larger than a gap between the flange portions 41d (a slot opening), and the diameter of the coil end portions 44b is smaller than the gap between the flange portions 41d.

As shown in FIG. 3, the slot-housed portions 44a are housed in each of the slots 41c with the longitudinal axes of the rectangular cross sections aligned in a circumferential direction and so as to line up in two rows in a radial direction and be arranged in five layers in close contact with each other. Moreover, in FIG. 3, it appears as if there are large gaps between the slot-housed portions 44a and inner wall surfaces of the slots 41c, but this is because the arrangement of the slot-housed portions 44a is shown schematically, and in reality, the slot-housed portions 44a are housed closely inside the slots 41c. Furthermore, although not shown in FIG. 3, insulators may be mounted inside the slots 41c.

Five of the slot-housed portions 44a housed in any given slot 41c are each linked at a first axial end of the stator core 41 by a coil end portion 44b to five slot-housed portions 44a housed in the slot 41c three slots away in a first circumferential direction, and each linked at a second axial end of the stator core 41 by a coil end portion 44b to five slot-housed portions 44a housed in the slot 41c three slots away in a second circumferential direction. The five remaining slot-housed portions 44a housed in the given slot 41c are each linked at the first axial end of the stator core 41 by a coil end portion 44b to five slot-housed portions 44a housed in the slot 41c three slots away in the second circumferential direction, and each linked at the second axial end of the stator core 41 by a coil end portion 44b to five slot-housed portions 44a housed in the slot 41c three slots away in the first circumferential direction.

In the stator winding 42 constructed in this manner, the conductor wires 44 projecting from each of the slots 41c are distributed half each onto first and second circumferential sides. In each of the distributed winding phase portions 43, bundles of five coil end portions 44b are arranged in a circumferential direction at a pitch of three slots. Thus, at the first and second axial ends of the stator core 41, layers of the bundles of coil end portions 44b arranged in a circumferential direction at a pitch of three slots are arranged in three layers so as to be mutually offset by one slot, constituting coil end groups 42f and 42r of the stator winding 42.

In the automotive alternator 20 constructed in this manner, an electric current is supplied from a battery (not shown) through the brushes 29 and the slip rings 28 to the field winding 33, generating magnetic flux. The first claw-shaped magnetic poles 34a on the first pole core 34 are magnetized into North-seeking (N) poles by this magnetic flux, and the second claw-shaped magnetic poles 35a on the second pole core 35 are magnetized into South-seeking (S) poles.

At the same time, the pulley 24 is driven by an engine and the rotor 27 is rotated by the shaft 26. A rotating magnetic field is applied to the stator core 41 due to the rotation of the rotor 27, generating an electromotive force in the stator winding 42. The alternating electromotive force generated in the stator winding 42 is converted into direct current by the rectifier 31 and the magnitude of the voltage output therefrom is adjusted by the regulator 32. The output from the rectifier 31 recharges the battery.

According to Embodiment 1, because the slot-housed portions 44a is formed with a rectangular cross section, the slot-housed portions 44a are housed inside the slots 41c in close contact with each other. As a result, gaps between the slot-housed portions 44a are reduced, enabling improvements in space factor, thereby enabling an alternator having high output to be achieved.

The coil end portions 44b rub against each other when the distributed winding phase portions 43 is being installed in the stator core 41, when the coil end portions 44b of the distributed winding phase portions 43 installed in the stator core 41 are being shaped, and when vibrations from an automobile act on the automotive alternator 20. Now, if the coil end portions have a rectangular cross section, electrically-insulating coating rubbed by the corner portions thereof is damaged. However, in this stator 40, because the coil end portions 44b are formed with a circular cross section, the occurrence of damage to the electrically-insulating coating resulting from rubbing among the coil end portions 44b is suppressed, improving electrical insulation.

Because the stator winding 42 is constituted by the distributed winding phase portions 43, the number of coil end portions 44b linking slot-housed portions 44a housed inside slots 41c three slots apart is reduced by half. In other words, in this stator 40, the number of coil end portions 44b linking slot-housed portions 44a housed inside slots 41c three slots apart is five. In the conventional winding construction, if a conductor wire is wound so as to enter a slot three slots away in the first circumferential direction whenever it projects from any given slot, the number of coil end portions is ten.

Thus, if the thickness of the coil end portions and the number of winds of the conductor wires are identical, bending stresses which act on each of the coil end portions 44b as a result of the bundles of the coil end portions 44b overlapping in a radial direction and coming into contact with each other are reduced in this stator 40 compared to the conventional winding construction in proportion to the reduction in the number of coil end portions 44b linking slot-housed portions 44a housed inside slots 41c three slots apart.

As a result, even if these bending stresses are concentrated at a boundary portion between the slot-housed portions 44a and the coil end portions 44b, the electrically-insulating coating at the boundary portion is less likely to be damaged, suppressing the occurrence of incidents of short-circuiting among the conductor wires 44.

Each of the distributed winding phase portions 43 is constructed by installing the conductor wire 44 so as to project from first and second ends of each of the slots 41c, be distributed on first and second circumferential sides, and enter slots 41c three slots away on both the first and second circumferential sides. Thus, radial overlap of the bundles of coil end portions 44b is dispersed in a circumferential direction, reducing radial expansion in the coil end groups 42f and 42r.

Hence, because there are fewer circumferential irregularities on the coil end groups 42f and 42r, wind noise arising as a result of pressure fluctuations between the coil end groups 42f and 42r and the rotor 27 and between the coil end groups 42f and 42r and the fans 25 is reduced during operation of the automotive alternator 20.

Because the slot-housed portions 44a are housed inside the slots 41c so as to line up in two rows in a radial direction, the flatness ratio of the slot-housed portions (i.e., the length of the long sides of the rectangular cross section divided by the length of the short sides of the rectangular cross section) can be reduced compared to when the slot-housed portions are housed inside the slots so as to line up in single rows in a radial direction. Moreover, when the slot-housed portions are formed by plastically deforming conductors having a circular cross section into a rectangular cross section, the degree of deformation of the conductors decreases as the flatness ratio is reduced. Thus, the occurrence of damage to the electrically-insulating coating in the plastic deformation process is suppressed in proportion to the reduction in the flatness ratio of the slot-housed portions, improving electrical insulation.

Because the length of the long sides of the rectangular cross section of the slot-housed portions 44a is formed so as to be larger than the slot openings, there is no dislodgment of the slot-housed portions 44a from the slots 41c.

Next, a method for manufacturing the stator 40 will be explained with reference to FIGS. 4A to 8.

Figure 4A:
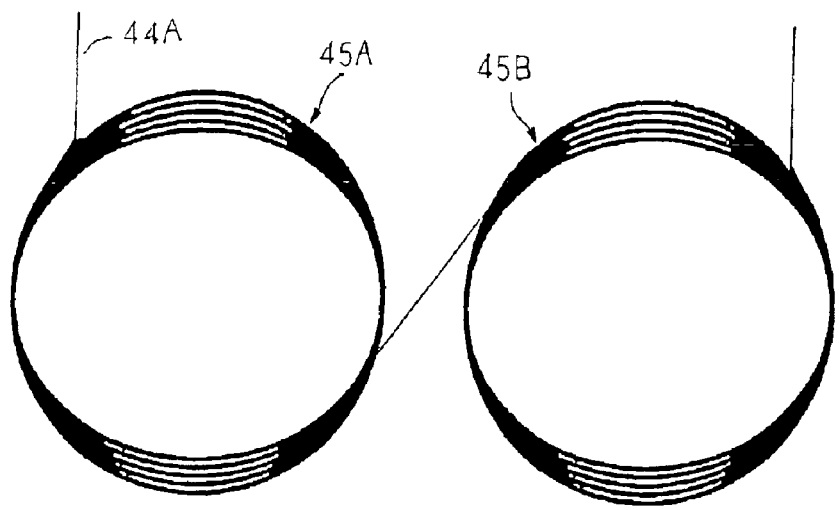
FIG. 4A is a process diagram explaining a process for manufacturing a star-shaped winding unit in a method for manufacturing the stator for an automotive alternator according to Embodiment 1 of the present invention.
Figure 4B:
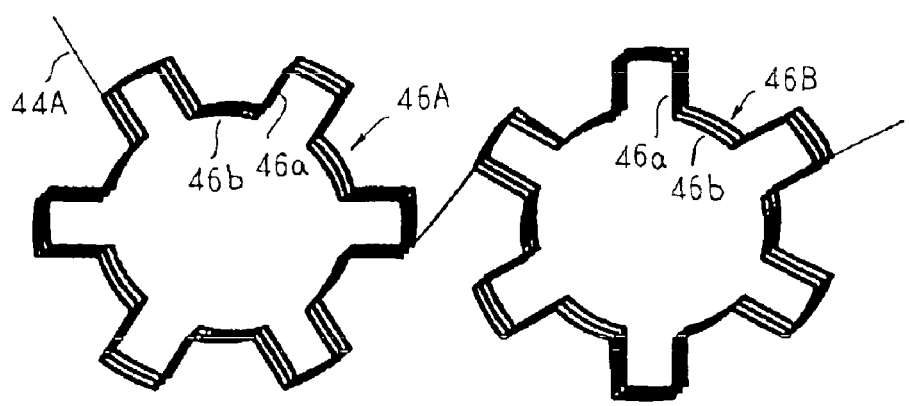
FIG. 4B is another process diagram explaining the process for manufacturing the star-shaped winding unit in the method for manufacturing the stator for an automotive alternator according to Embodiment 1 of the present invention.
Figure 4C:
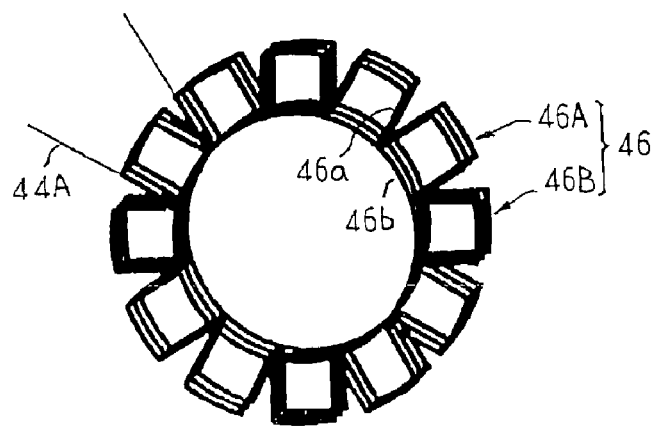
FIG. 4C is another process diagram explaining the process for manufacturing the star-shaped winding unit in the method for manufacturing the stator for an automotive alternator according to Embodiment 1 of the present invention.
Figure 5:
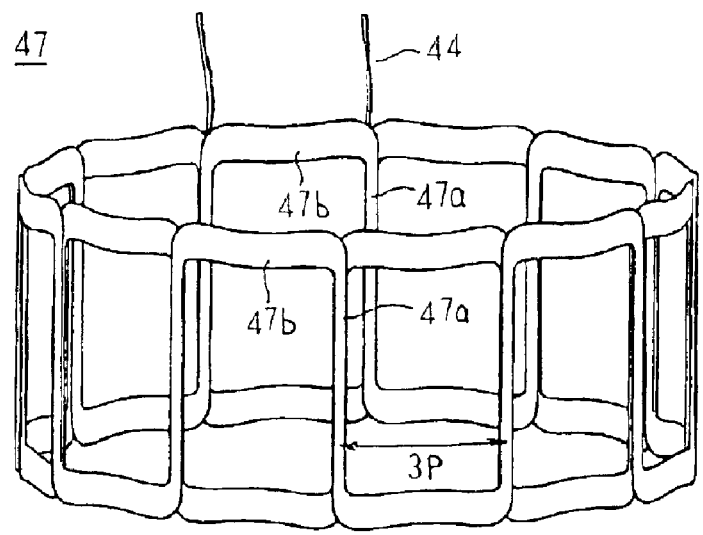
FIG. 5 is a perspective showing a distributed winding unit in the stator for an automotive alternator according to Embodiment 1 of the present invention.
Figure 6:
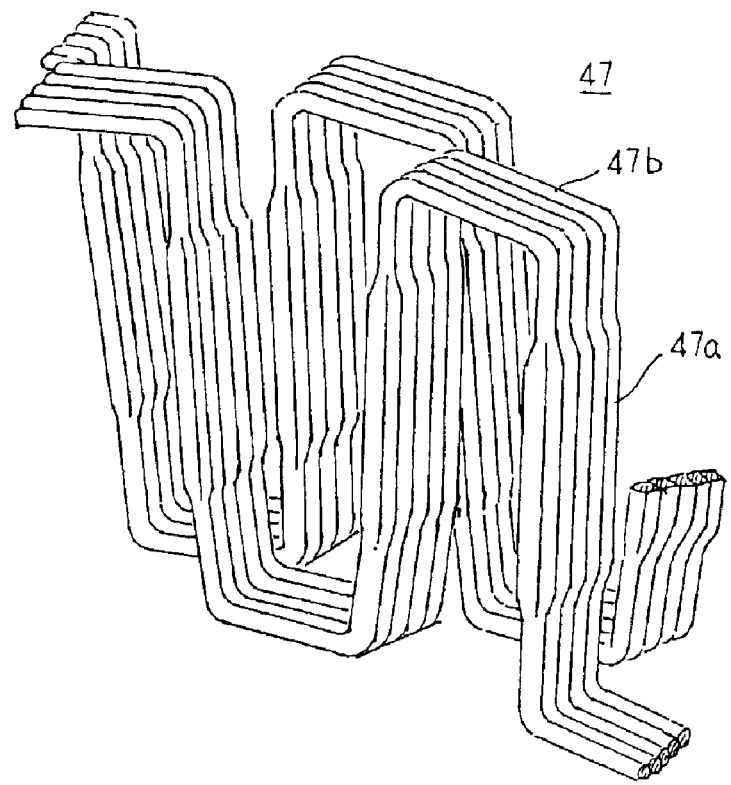
FIG. 6 is a partial enlargement showing the distributed winding unit in the stator for an automotive alternator according to Embodiment 1 of the present invention.
Figure 7:
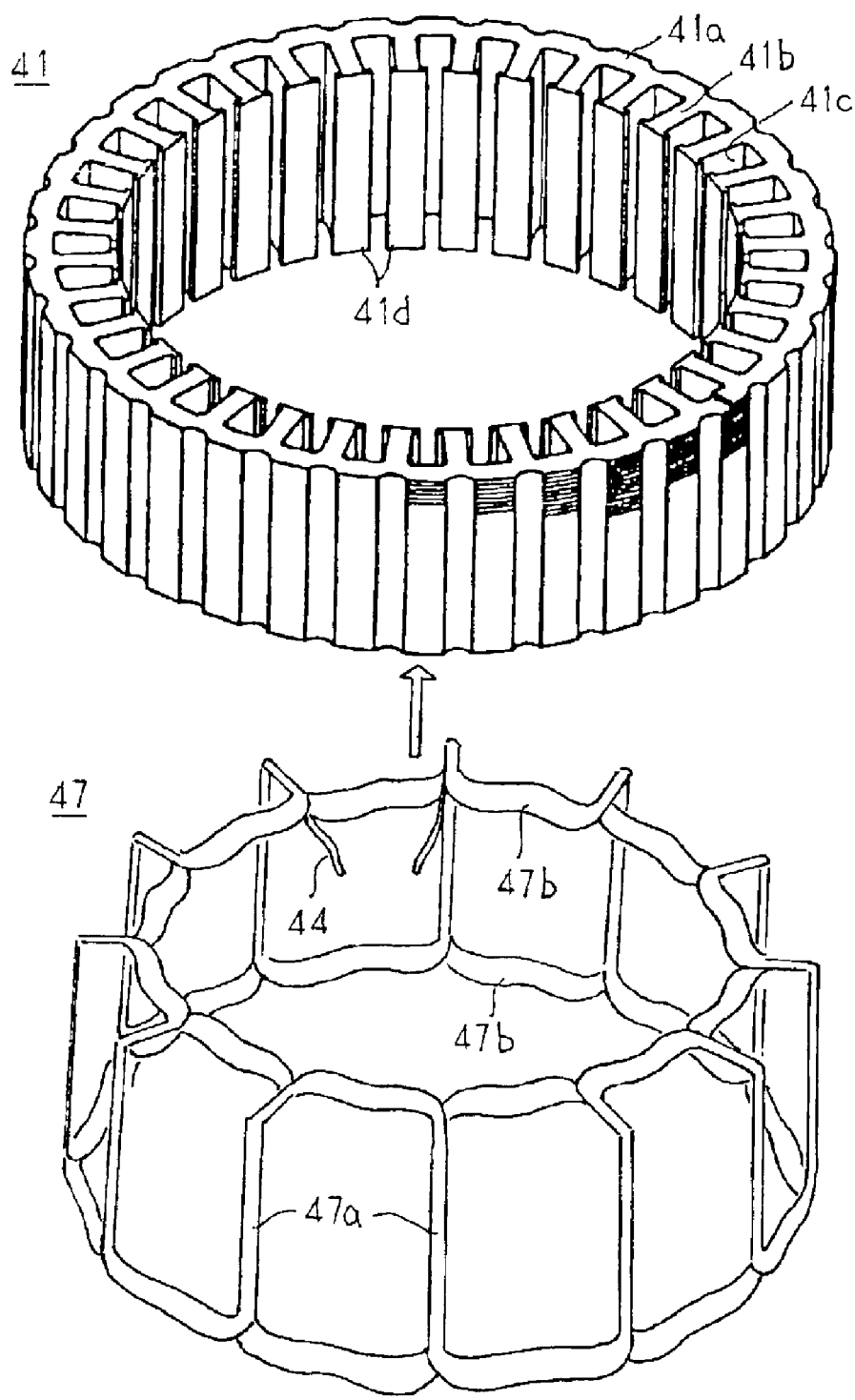
FIG. 7 is a process diagram explaining a process for mounting the distributed winding unit into a stator core in the method for manufacturing the stator for an automotive alternator according to Embodiment 1 of the present invention.
Figure 8:
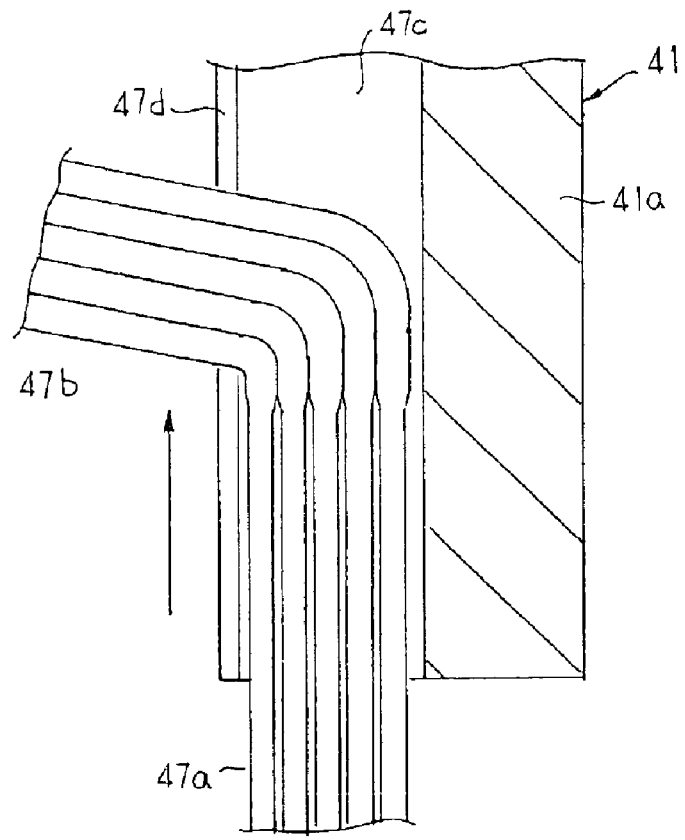
FIG. 8 is a partial cross section explaining the process for mounting the distributed winding unit in the stator core in the method for manufacturing the stator for an automotive alternator according to Embodiment 1 of the present invention.

FIGS. 4A to 4C are process diagrams explaining a process for manufacturing a star-shaped winding unit in a method for manufacturing the stator for an automotive alternator according to Embodiment 1 of the present invention, FIGS. 5 and 6 are a perspective and a partial enlargement, respectively, showing a distributed winding unit in the stator for an automotive alternator according to Embodiment 1 of the present invention, FIG. 7 is a process diagram explaining a process for mounting the distributed winding unit in a stator core in the method for manufacturing the stator for an automotive alternator according to Embodiment 1 of the present invention, and FIG. 8 is a partial cross section explaining the process for mounting the distributed winding unit in the stator core in the method for manufacturing the stator for an automotive alternator according to Embodiment 1 of the present invention.

First, as shown in FIG. 4A, a first annular winding unit 45A is prepared by winding one conductor wire 44A composed of a copper wire material having a circular cross section covered with an electrically-insulating coating into a ring shape for five winds, and a second annular winding unit 45B is prepared by winding the conductor wire 44A into a ring shape for another five winds.

Next, as shown in FIG. 4B, first and second star-shaped winding sub-units 46A and 46B having a star-shaped pattern in which end portions of adjacent pairs of straight slot-housed portions 46a are alternately linked on an inner circumferential side and an outer circumferential side by U-shaped coil end portions 46b are prepared by bending the first and second annular winding units 45A and 45B. In the first and second star-shaped winding sub-units 46A and 46B, twelve bundles of five slot-housed portions 46a are arranged so as to have a predetermined spacing in a circumferential direction.

Then, a star-shaped winding unit 46 is prepared, as shown in FIG. 4C, by folding over the portion of the conductor wire 44A linking the first and second star-shaped winding sub-units 46A and 46B, and stacking the first and second star-shaped winding sub-units 46A and 46B on top of one another such that the peak portions and the valley portions of the two star-shaped patterns are superposed, that is, such that the coil end portions 46b face each other in a radial direction.

Next, each of the bundles of slot-housed portions 46a of the star-shaped winding unit 46 is set in a press forming machine (not shown). Here, the slot-housed portions 46a in each of the bundles are stacked in single rows in the direction of pressure. All of the bundles of slot-housed portions 46a are pressed simultaneously by pushers (not shown). Hence, the slot-housed portions 46a are plastically deformed from a circular cross section into a rectangular cross section. Each of the slot-housed portions 46a have a substantially identical cross-sectional shape. Here, the press forming machine has a predetermined number of pairs of the slides 14 and the stoppers 15 from the conventional press forming machine 13 arranged in a circumferential direction.

As shown in FIGS. 5 and 6, a distributed winding unit 47 is prepared by reshaping the star-shaped winding unit 46 into a cylindrical shape. In this distributed winding unit 47, a conductor wire 44 is wound for ten turns into a wave winding. Bundles of ten slot-housed portions 47a (corresponding to the slot-housed portions 46a plastically deformed into a rectangular cross section) are arranged at a pitch of three slots in a circumferential direction such that the longitudinal directions thereof are parallel to an axial direction. Furthermore, five of the slot-housed portions 47a in each of the bundles are alternately linked at first and second axial ends by coil end portions 47b (corresponding to the coil end portions 46b). The remaining five slot-housed portions 47a in each of the bundles are alternately linked in a similar manner at first and second axial ends by coil end portions 47b. Moreover, the coil end portions 47b linking each set of five slot-housed portions 47a face each other in an axial direction.

Next, the coil end portions 47b at the first axial end of the distributed winding unit 47 are bent radially inward. As shown in FIG. 7, the distributed winding unit 47 is mounted to the stator core 41 from an axial direction. Here, as shown in FIG. 8, portions of the coil end portions 47b bent radially inward which are in the vicinity of the slot-housed portions 47a are moved in an axial direction between the flange portions 41d (the slot openings), leading the slot-housed portions 47a inside the slots 41c. After the slot-housed portions 47a have been led completely inside the slots 41c, the coil end portions 47b bent radially inward are restored so as to extend in an axial direction, completing the mounting of a first distributed winding unit 47 into the stator core 41.

A second distributed winding unit 47 is similarly mounted to the stator core 41 such that the slots 41c into which it is inserted are offset by one slot. A third distributed winding unit 47 is similarly mounted to the stator core 41, obtaining the stator 40 shown in FIG. 2.

According to the method for manufacturing the stator according to Embodiment 1, because the slot-housed portions 47a of the distributed winding units 47 are formed with the rectangular cross section before being inserted into the slots 41c, the slot-housed portions 47a can be housed inside the slots 41c without gaps. As a result, the space factor is improved, enabling improvements in the output of the alternator.

Because the slot-housed portions 46a of the star-shaped winding unit 46 are press-deformed into the rectangular cross section using the press forming machine after forming the star-shaped winding unit 46 using conductor wires 44A having a circular cross section, the slot-housed portions 46a can be set in a jig (between the slides and the stoppers, for example) in an aligned state, enabling suppression of the occurrence of damage to the electrically-insulating coating resulting from press-deforming entangled conductor wires 44A. As a result, the occurrence of short-circuiting among the conductor wires 44 is suppressed, enabling reductions in the rate of production of the stator 40 to be prevented.

Because all of the slot-housed portions 46a are press-formed simultaneously, the process for plastically deforming the slot-housed portions into the rectangular cross section is simplified.

Because the coil end portions 47b have a circular cross section, the occurrence of damage to the electrically-insulating coating resulting from rubbing among the coil end portions 47b in the manufacturing process for the stator is suppressed, improving electrical insulation.

Because the distributed winding units 47 are mounted to the stator core 41 from an axial direction such that the slot-housed portions 47a are inserted inside the slots 41c while a portion of the coil end portions 47b of the distributed winding units 47 pass between the flange portions 41d, the flange portions 41d can be formed on the tip portions of the tooth portions 41b at the stage when the stator core 41 is prepared. Thus, the process for preparing the flange portions 5 in the method for manufacturing the conventional stator 1 is no longer necessary, enabling simplification of the manufacturing process.

Because the flange portions 41d can be simultaneously formed when the magnetic steel sheet which is the material of the stator core 41 is press formed, the shapes of the flange portions 41d, that is, the shapes of the tips of the tooth portions 41b can be formed with high precision. Thus, the magnetic circuit is formed in a well-balanced manner when the stator 40 is mounted to an automotive alternator, suppressing aggravation of electromagnetic noise.

Because the coil end portions 47b of the distributed winding units 47 are bent radially inward before being mounted to the stator core 41, the coil end portions 47b do not come into contact with the stator core 41, enabling a portion of the coil end portions 47b to be passed between the flange portions 41d. Thus, mounting workability of the distributed winding units 47 is improved, and the occurrence of damage to the electrically-insulating coating resulting from contact between the coil end portions 47b and the stator core 41 is also suppressed.

Moreover, in Embodiment 1 above, the slots 41c are formed with a substantially trapezoidal shape, but the tooth portions may be formed with a trapezoidal cross section and the slots formed with a substantially rectangular shape. In that case, because the bundles of slot-housed portions 44a arranged in two rows in a radial direction can be made to conform to the shapes of the slots, the space factor is raised, and displacement of the slot-housed portions inside the slots by vibration is suppressed, suppressing the occurrence of damage to the electrically-insulating coating.

In the stator 40 according to Embodiment 1 above, an electrically-insulating resin such as a varnish may be applied to the coil end groups 42f and 42r. In that case, because the electrically-insulating resin fixes the coil end portions 44b together, eliminating rubbing among the coil end portions 44b resulting from vibration, deterioration of electrical insulation accompanying damage to the electrically-insulating coating on the coil end portions 44b is suppressed.

Embodiment 1 above has been explained for cases in which the distributed winding units 47 are mounted to the stator core 41 one at a time, but the three distributed winding units 47 may also be stacked concentrically and mounted to the stator core 41 together. In that case, the process for mounting the distributed winding units 47 to the stator core 41 is simplified.

Embodiment 2

Figure 9:
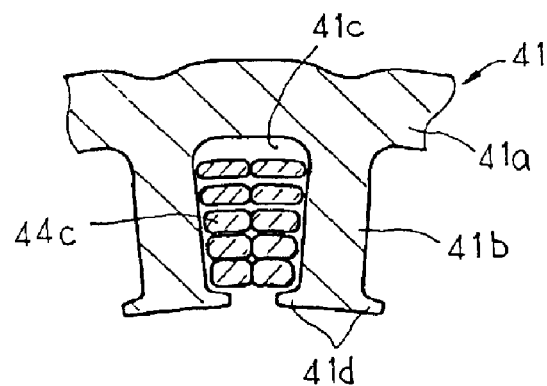
FIG. 9 is a partial cross section showing a slot-housed state of a stator winding in a stator for an automotive alternator according to Embodiment 2 of the present invention.

FIG. 9 is a partial cross section showing a slot-housed state of a stator winding in a stator for an automotive alternator according to Embodiment 2 of the present invention.

In Embodiment 2, slot-housed portions 44c having rectangular cross sections are arranged in five layers so as to line up in two rows in a radial direction inside the slots 41c. The slot-housed portions 44c are formed such that the flatness ratio of each decreases sequentially from the outermost layer to the innermost layer and formed such that bundles of the slot-housed portions 44c arranged in two rows in a radial direction conform to the substantially trapezoidal shape of the slots 41c.

Moreover, the rest of this embodiment is constructed in a similar manner to Embodiment 1 above.

According to Embodiment 2, because the slot-housed portions 44c are formed such that the flatness ratio of each decreases sequentially from the outermost layer to the innermost layer and formed such that bundles of the slot-housed portions 44c arranged in two rows in a radial direction conform to the substantially trapezoidal shape of the slots 41c, the space factor is increased. In addition, displacement of the slot-housed portions 44c inside the slots 41c by vibration is suppressed, suppressing the occurrence of damage to the electrically-insulating coating.

The process for plastically deforming the slot-housed portions into the rectangular cross sections according to Embodiment 2 will now be explained.

First, a star-shaped winding unit 46 is prepared in a similar manner to Embodiment 1 above.

Next, slot-housed portions 46a from each of the bundles of slot-housed portions 46a in the first and second star-shaped winding sub-units 46A and 46B constituting the star-shaped winding unit 46 are set in the press forming machine one at a time, twenty-four slot-housed portions 46a being plastically deformed into rectangular cross sections at the same time. This process is repeated five times to deform all of the slot-housed portions 46a into rectangular cross sections. Here, the pressure from the pusher in each step of the process is varied sequentially to form slot-housed portions 44c having five kinds of cross-sectional shape such that the flatness ratio of each is reduced sequentially in five stages.

The slot-housed portions 44c prepared in this manner, as shown in FIG. 9, are arranged inside the slots 41c in two rows in a radial direction such that the flatness ratio thereof decreases sequentially from the outermost layer to the innermost layer. The bundles of slot-housed portions 44c housed inside the slots 41c conform to the substantially trapezoidal shape of the slots 41c.

Consequently, because the flatness ratio of the slot-housed portions can be adjusted at will if the process for forming the slot-housed portions of the star-shaped winding unit into the rectangular cross sections according to Embodiment 2 is applied, the slot-housed portions can be housed at a high space factor even in slots 41c having a substantially trapezoidal shape.

Embodiment 3

In Embodiment 1 above, the star-shaped winding unit 47 is prepared using one conductor wire 44A, but in Embodiment 3, a star-shaped winding unit 49 is prepared using two conductor wires 44A.

Moreover, the rest of this embodiment is constructed in a similar manner to Embodiment 1 above.

Figure 10:
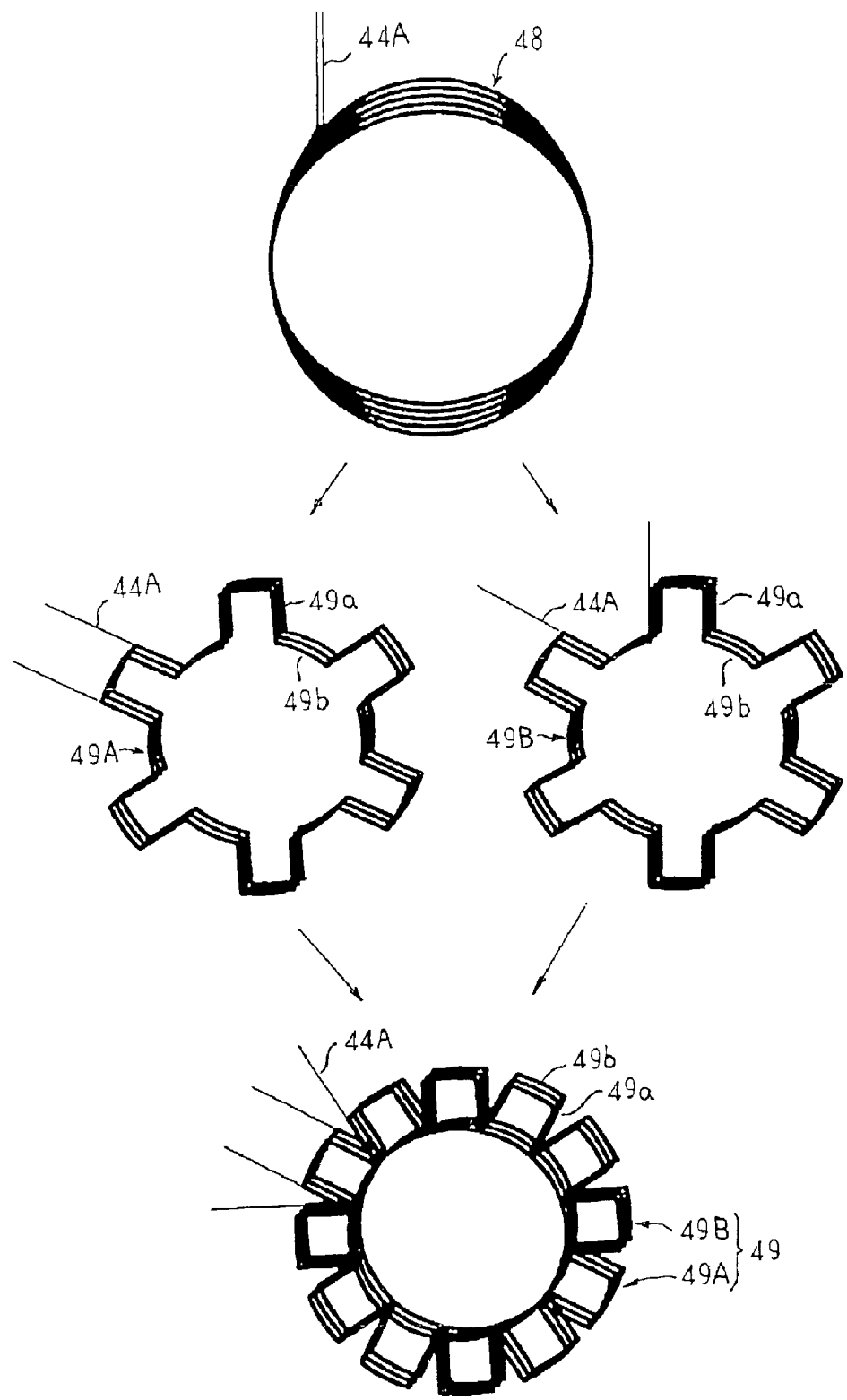
FIG. 10 is a process diagram explaining a process for manufacturing a star-shaped winding unit in a method for manufacturing a stator for a stator for an automotive alternator according to Embodiment 3 of the present invention.

The process for manufacturing the star-shaped winding unit 49 according to Embodiment 3 will now be explained with reference to FIG. 10.

First, a annular winding unit 48 is prepared by winding one conductor wire 44A into a ring shape for five turns. Similarly, another annular winding unit 48 is prepared by winding another conductor wire 44A into a ring shape for five turns.

Next, first and second star-shaped winding sub-units 49A and 49B having a star-shaped pattern in which end portions of adjacent pairs of straight slot-housed portions 49a are alternately linked on an inner circumferential side and an outer circumferential side by U-shaped coil end portions 49b are prepared by bending each of the annular winding units 48. In the first and second star-shaped winding sub-units 49A and 49B, twelve bundles of five slot-housed portions 49a are arranged so as to have a predetermined spacing in a circumferential direction, respectively.

Then, the star-shaped winding unit 49 is prepared by stacking the first and second star-shaped winding sub-units 49A and 49B on top of one another such that the peak portions and the valley portions of both star-shaped patterns are superposed, that is, such that the coil end portions 49b face each other in a radial direction.

The star-shaped winding unit 49 prepared in this manner is constructed in a similar manner to the star-shaped winding unit 47 according to Embodiment 1 except for the fact that the first and second star-shaped winding sub-units 49A and 49B are each prepared using one conductor wire 44A.

Thus, a stator equivalent to the stator 40 according to Embodiment 1 can be obtained by adopting the same manufacturing method as in Embodiment 1 above using the star-shaped winding unit 49 according to Embodiment 3 in place of the star-shaped winding unit 47 according to Embodiment 1.

Consequently, similar effects to those in Embodiment 1 above can also be achieved in Embodiment 3.

Embodiment 4

Figure 11:
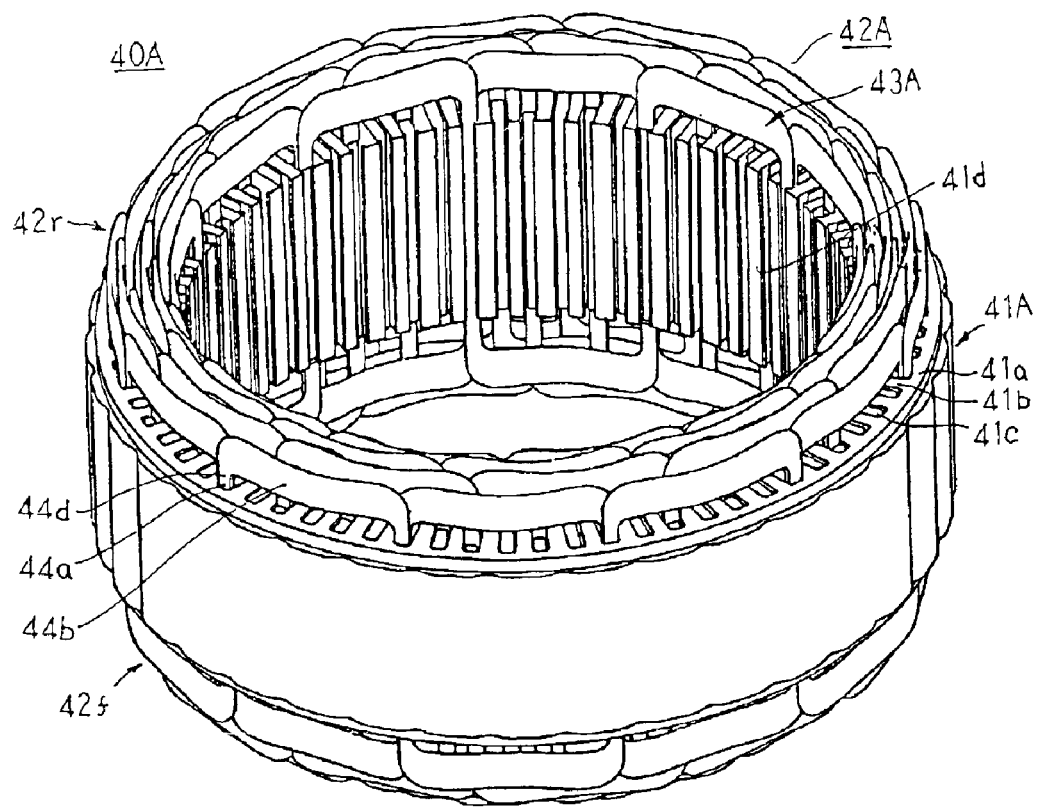
FIG. 11 is a perspective showing a stator for an automotive alternator according to Embodiment 4 of the present invention.
Figure 12:
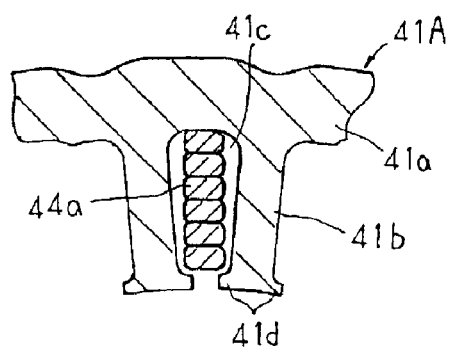
FIG. 12 is a partial cross section showing a slot-housed state of a stator winding in the stator for an automotive alternator according to Embodiment 4 of the present invention.
Figure 13:
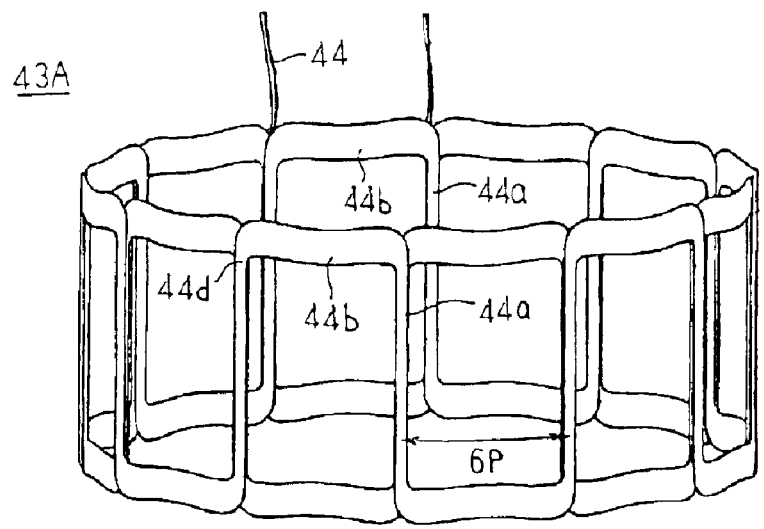
FIG. 13 is a perspective showing a distributed winding phase portion in the stator for an automotive alternator according to Embodiment 4 of the present invention.
Figure 14:
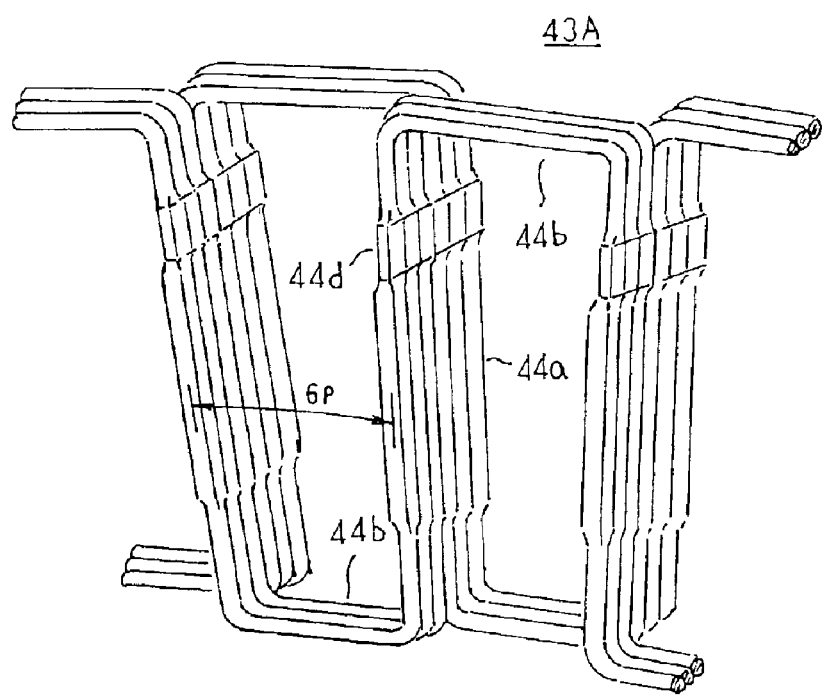
FIG. 14 is an enlargement showing part of the distributed winding phase portion in the stator for an automotive alternator according to Embodiment 4 of the present invention.

FIG. 11 is a perspective showing a stator for an automotive alternator according to Embodiment 4 of the present invention, FIG. 12 is a partial cross section showing a slot-housed state of a stator winding in the stator for an automotive alternator according to Embodiment 4 of the present invention, FIG. 13 is a perspective showing a distributed winding phase portion in the stator for an automotive alternator according to Embodiment 4 of the present invention, and FIG. 14 is an enlargement showing part of the distributed winding phase portion in the stator for an automotive alternator according to Embodiment 4 of the present invention.

In FIG. 11, a stator core 41A is prepared into a cylindrical shape by laminating and integrating a magnetic steel sheet pressed into a predetermined shape, slots 41c being formed in the stator core 41A at an even angular pitch in a circumferential direction at a ratio of two per phase per pole. In other words, for the twelve claw-shaped magnetic poles in the rotor 27, seventy-two slots 41c are disposed in the stator core 41A to obtain a stator winding 42A composed of two three-phase alternating-current windings. Moreover, except for the fact that the slots 41c are formed at a ratio of two per phase per pole, the stator core 41A is constructed in a similar manner to the stator core 41 described above.

The stator winding 42A is provided with six distributed winding phase portions 43A mounted to the stator core 41A such that the slots 41c in which each distributed winding phase portion 43A is mounted are offset by one slot each. Two three-phase alternating-current windings are each constructed by forming three of the distributed winding phase portions 43A into an alternating-current connection, such as a Y connection, for example.

Each of the distributed winding phase portions 43A, as shown in FIGS. 13 and 14, is constructed by winding one conductor wire 44 composed of a copper wire material covered with an electrically-insulating coating into a wave shape in every sixth slot 41c for three turns in a first circumferential direction and then continuing to wind the conductor wire 44 into a wave shape in every sixth slot 41c for three turns in a second circumferential direction. Slot-housed portions 44a of the conductor wires 44 housed inside the slots 41c are formed with a rectangular cross section, and coil end portions 44b linking slot-housed portions 44a housed in slots 41c six slots apart at axial ends of the stator core 41A are formed with a circular cross section. In addition, linking portions between the slot-housed portions 44a and the coil end portions 44b are formed with a flat cross section, constituting slot-opening passing portions 44d.

As shown in FIG. 12, the slot-housed portions 44a are housed in each of the slots 41c with the longitudinal axes of the rectangular cross sections aligned in a circumferential direction and so as to line up in single rows in a radial direction and be arranged in six layers in close contact with each other.

Here, the length of the long sides of the rectangular cross section of the slot-housed portions 44a is larger than gaps between the flange portions 41d (the slot openings). The longitudinal axes of the flat cross sections of the slot-opening passing portions 44d are perpendicular to the longitudinal axes of the rectangular cross sections of the slot-housed portions 44a, the length of the minor axes of the flat cross sections of the slot-opening passing portions 44d being smaller than the gaps between the flange portions 41d.

Three of the slot-housed portions 44a housed in any given slot 41c are each linked at a first axial end of the stator core 41A by a coil end portion 44b to three slot-housed portions 44a housed in the slot 41c six slots away in a first circumferential direction, and each linked at a second axial end of the stator core 41A by a coil end portion 44b to three slot-housed portions 44a housed in the slot 41c six slots away in a second circumferential direction. The three remaining slot-housed portions 44a housed in the given slot 41c are each linked at the first axial end of the stator core 41A by a coil end portion 44b to three slot-housed portions 44a housed in the slot 41c six slots away in the second circumferential direction, and each linked at the second axial end of the stator core 41A by a coil end portion 44b to three slot-housed portions 44a housed in the slot 41c six slots away in the first circumferential direction.

In the stator winding 42A constructed in this manner, the conductor wires 44 projecting from each of the slots 41c are distributed half each onto first and second circumferential sides. In each of the distributed winding phase portions 43A, bundles of three coil end portions 44b are arranged in a circumferential direction at a pitch of six slots. Thus, at the first and second axial ends of the stator core 41A, layers of the bundles of coil end portions 44b arranged in a circumferential direction at a pitch of six slots are arranged in six layers so as to be mutually offset by one slot, constituting the coil end groups 42f and 42r of the stator winding 42A.

Consequently, similar effects to those in Embodiment 1 above can also be achieved in the stator 40A constructed in this manner.

In this stator 40A, because the slots 41c are formed at a ratio of two per phase per pole, the shape of the slots is narrow compared to slots formed at a ratio of one per phase per pole. Furthermore, the slot-housed portions 44a are arranged inside the slots 41c so as to line up in single rows in a radial direction. As a result, the flatness ratio of the slot-housed portions 44a is reduced, enabling suppression of the occurrence of damage to the electrically-insulating coating during formation of the slot-housed portions 44a.

Because slot-opening passing portions 44d having a flat cross section having a width which is thinner than the slot openings are formed on the linking portion between the slot-housed portions 44a and the coil end portions 44b, the slot-housed portions 44a can be inserted inside the slots 41c while passing the slot-opening passing portions 44d through the slot openings during mounting of the distributed winding phase portions 43A. As a result, contact between the conductor wires 44 and the stator core 41A can be avoided, suppressing the occurrence of damage to the electrically-insulating coating.

Next, a method for manufacturing the distributed winding units constituting the distributed winding phase portions 43A will be explained.

First, by the process shown in FIGS. 4A to 4C, a star-shaped winding unit is prepared in which first and second star-shaped winding sub-units each formed by winding a conductor wire 44A for three turns are stacked on top of one another such that the peak portions and the valley portions of both star-shaped patterns are superposed, that is, such that the coil end portions face each other in a radial direction.

Next, each of the bundles of slot-housed portions of the star-shaped winding unit is set in a press forming machine, and all of the bundles of slot-housed portions are pressed simultaneously by pushers. Hence, the slot-housed portions of the star-shaped winding unit are plastically deformed from a circular cross section into a rectangular cross section.

Next, the slot-opening passing portions 44d having a flat cross section are formed by plastically deforming the coil end portions in the vicinity of the slot-housed portions into a flat cross section using the press forming machine.

A distributed winding unit having an identical shape to the distributed winding phase portion 43A shown in FIGS. 13 and 14 is prepared by reshaping the star-shaped winding unit into a cylindrical shape.

Next, the coil end portions at a first axial end of the distributed winding unit prepared in this manner (i.e., at the end where the slot-opening passing portions are formed) are bent radially inward. The distributed winding unit is mounted to the stator core 41A from an axial direction. Here, the slot-opening passing portions 44d formed on the coil end portions in the vicinity of the slot-housed portions are moved in an axial direction between the flange portions 41d, leading the slot-housed portions inside the slots 41c. After the slot-housed portions have been led completely inside the slots 41c, the coil end portions bent radially inward are restored so as to extend in an axial direction, completing the mounting of a first distributed winding unit into the stator core 41A.

Second to sixth distributed winding units are similarly mounted to the stator core 41A, such that the slots 41c they are inserted into are offset by one slot each, obtaining the stator 40A shown in FIG. 12.

In Embodiment 4, because slot-opening passing portions 44d having a flat cross section having a width which is thinner than the slot openings are formed on the coil end portions 44b in the vicinity of the slot-housed portions 44a, the slot-housed portions 44a can be inserted inside the slots 41c while passing the slot-opening passing portions 44d through the slot openings during mounting of the distributed winding units. As a result, contact between the conductor wires 44 and the stator core 41A can be avoided, suppressing the occurrence of damage to the electrically-insulating coating.

Because the slot-opening passing portions 44d are formed, the diameter of the coil end portions 44b can be increased. In other words, reductions in the resistance of the conductor wires 44 become possible, suppressing the generation of heat during energization and enabling increased output.

Moreover, in Embodiment 4 above, the process for forming the slot-housed portions of the star-shaped winding unit into rectangular cross sections according to Embodiment 2 above may also be adopted to form the slot-housed portions 44a such that the flatness ratio of each decreases sequentially from the outermost layer to the innermost layer, thereby making the bundles of slot-housed portions 44a housed inside the slots 41c conform to the substantially trapezoidal shape of the slots 41c.

Furthermore, in Embodiment 4 above, a stator core 41A in which slots 41c are formed at a ratio of two per phase per pole is used, but similar effects can also be achieved by using a stator core in which slots are formed at a ratio of three or more per phase per pole.

Embodiment 5

Figure 15:
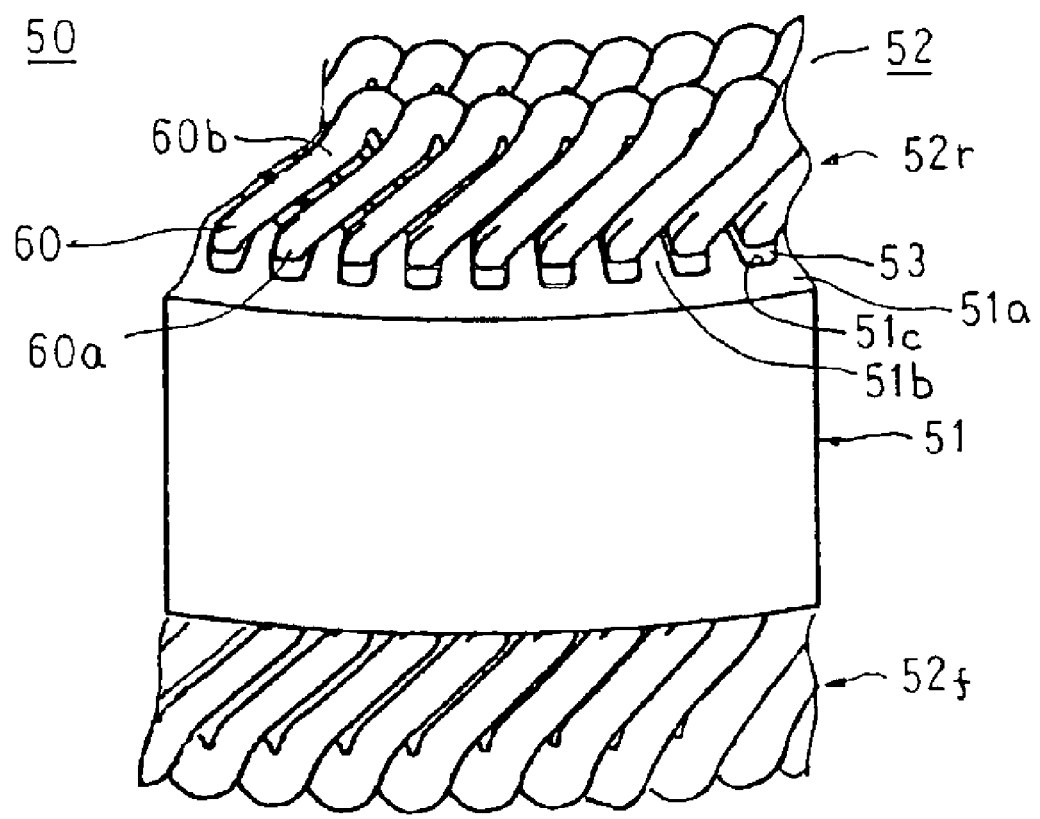
FIG. 15 is a partial perspective showing part of a stator for an automotive alternator according to Embodiment 5 of the present invention.
Figure 16:
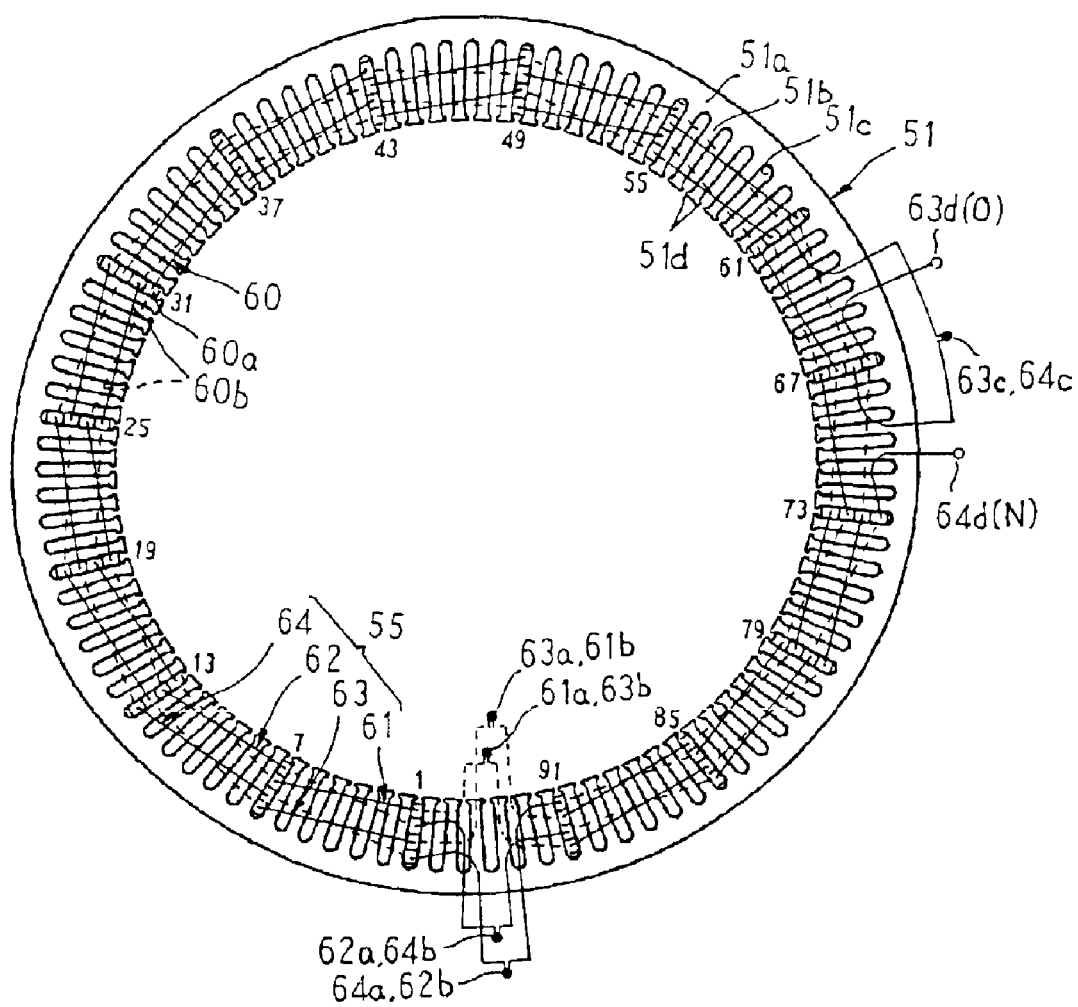
FIG. 16 is an end elevation explaining connections in a distributed winding phase portion in a stator winding of the stator for an automotive alternator according to Embodiment 5 of the present invention.
Figure 17:
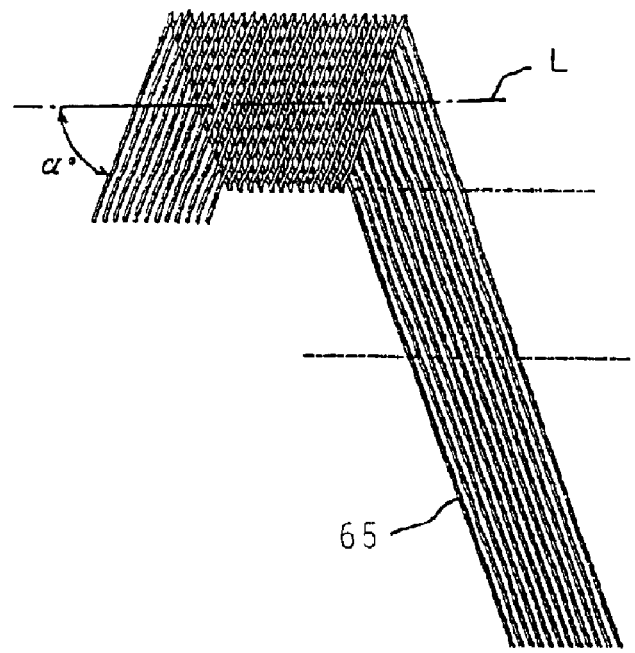
FIG. 17 is a diagram explaining a method for manufacturing a winding assembly used in the stator winding of the stator for an automotive alternator according to Embodiment 5 of the present invention.
Figure 18:
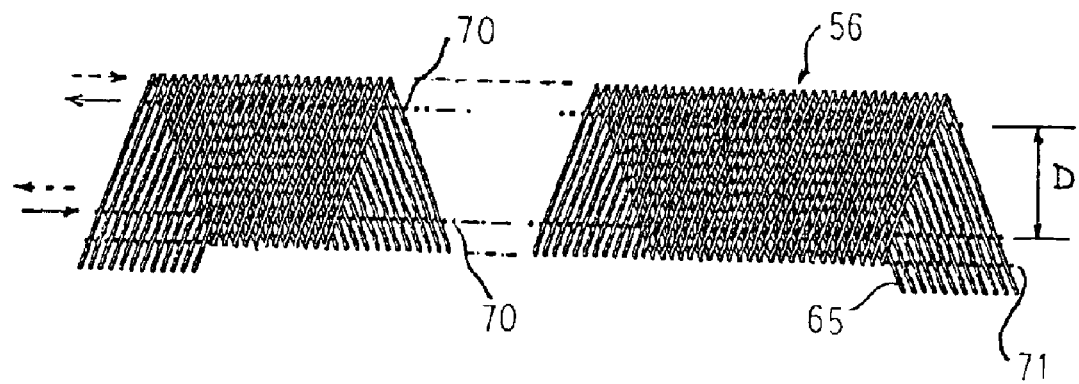
FIG. 18 is another diagram explaining the method for manufacturing the winding assembly used in the stator winding of the stator for an automotive alternator according to Embodiment 5 of the present invention.
Figure 19A:
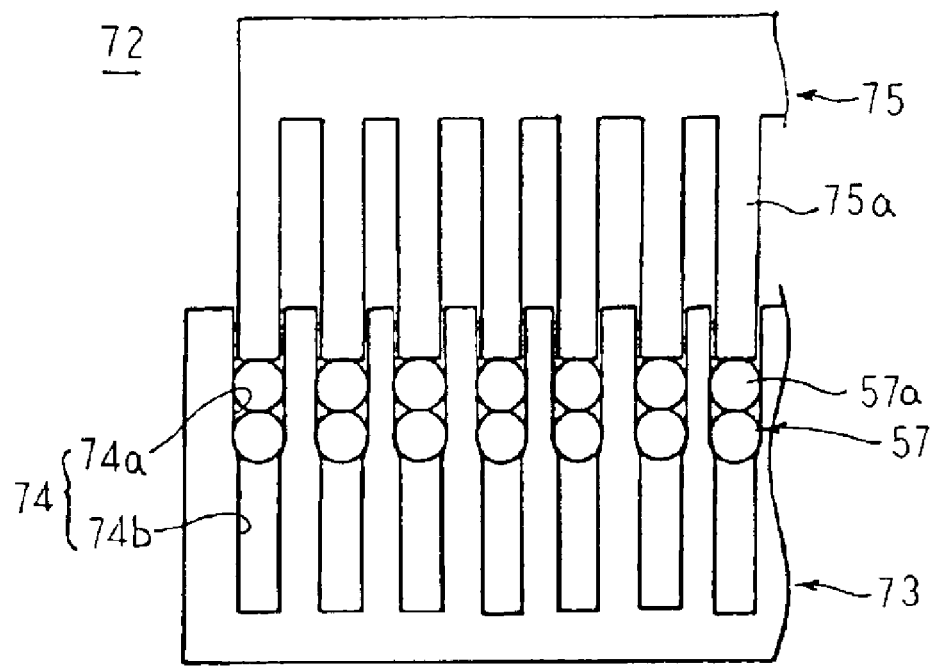
FIG. 19A is another diagram explaining the method for manufacturing the winding assembly used in the stator winding of the stator for an automotive alternator according to Embodiment 5 of the present invention.
Figure 19B:
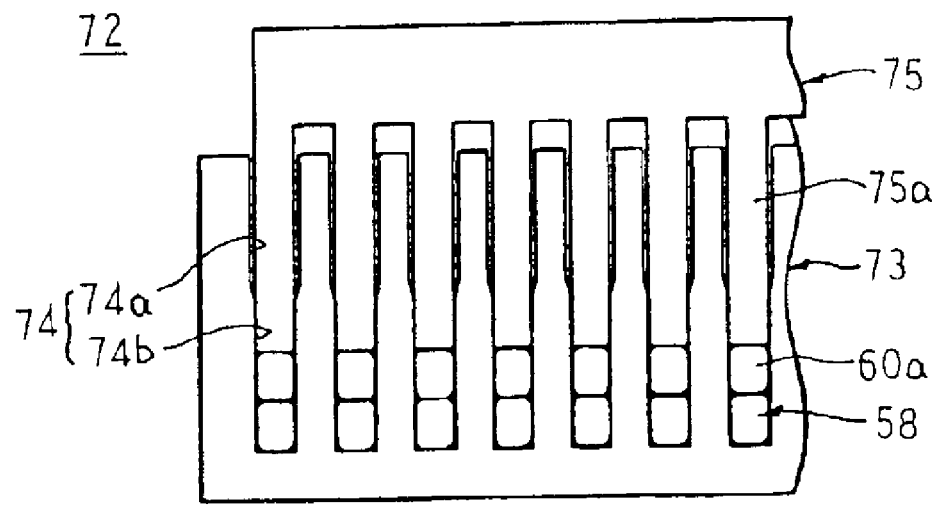
FIG. 19B is another diagram explaining the method for manufacturing the winding assembly used in the stator winding of the stator for an automotive alternator according to Embodiment 5 of the present invention.
Figure 21:
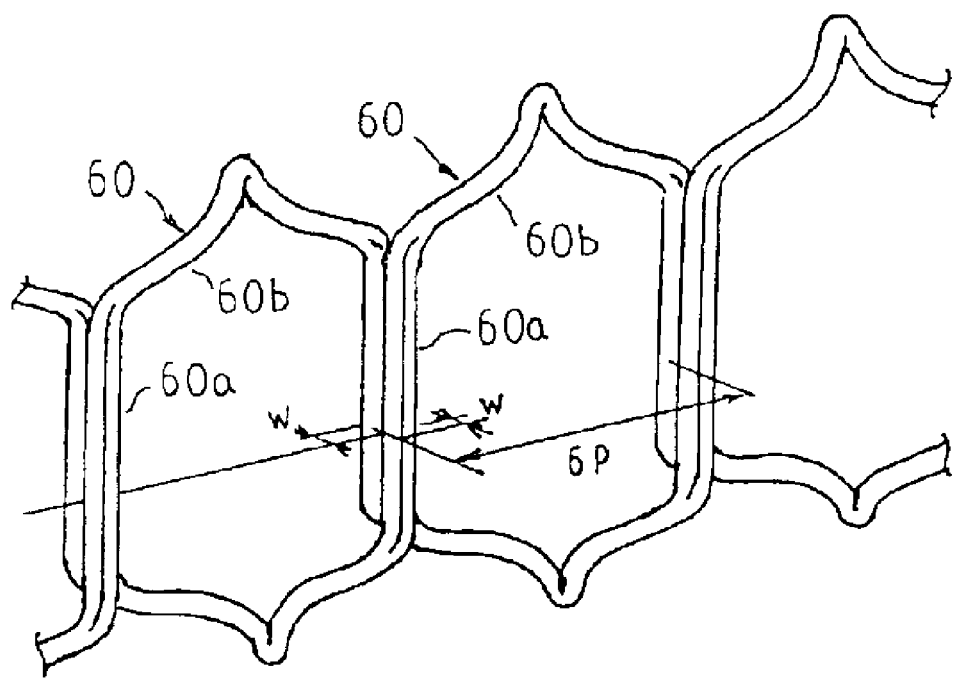
FIG. 21 is a perspective explaining a winding construction of the winding assembly used in the stator winding of the stator for an automotive alternator according to Embodiment 5 of the present invention.
Figure 22A:
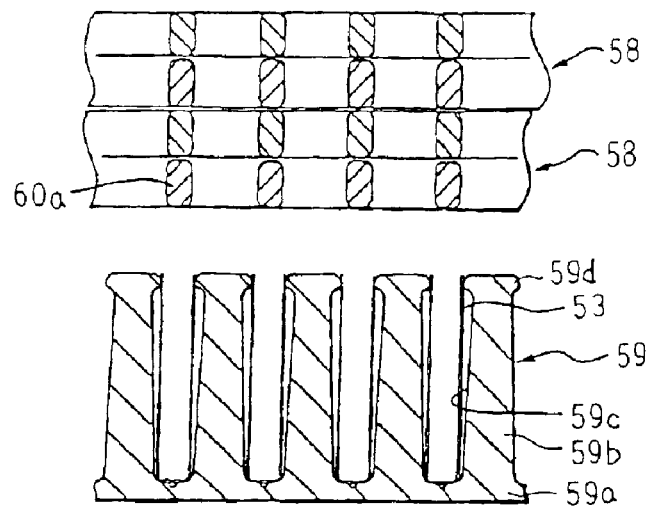
FIG. 22A is a process cross section explaining a method for manufacturing the stator of the automotive alternator according to Embodiment 5 of the present invention.
Figure 22B:
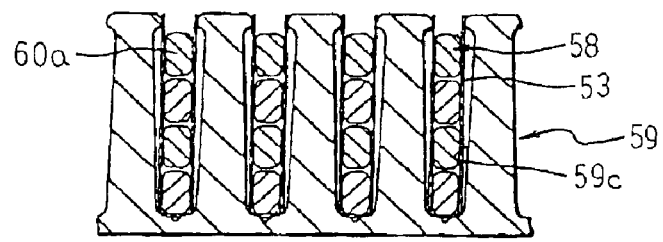
FIG. 22B is another process cross section explaining the method for manufacturing the stator of the automotive alternator according to Embodiment 5 of the present invention.
Figure 22C:
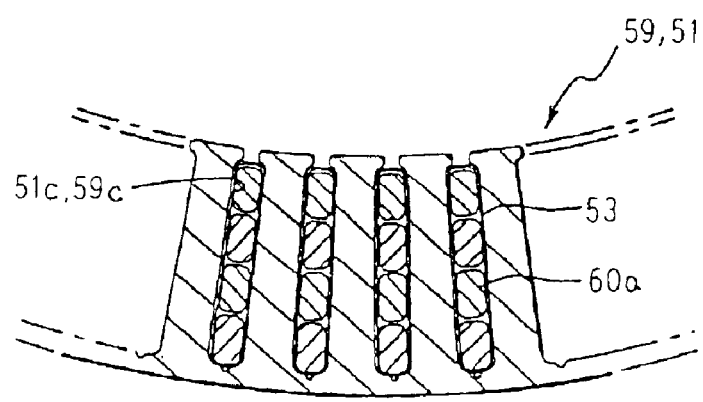
FIG. 22C is another process cross section explaining the method for manufacturing the stator of the automotive alternator according to Embodiment 5 of the present invention.
Figure 23:
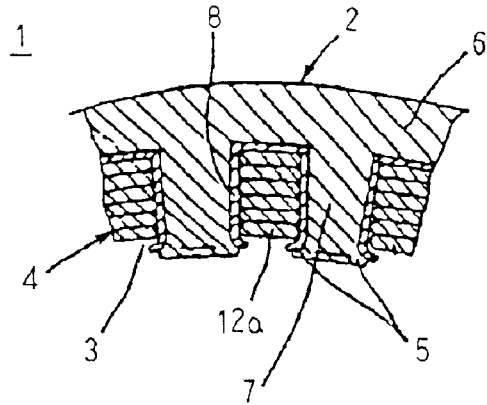
FIG. 23 is a partial cross section showing a conventional stator for an alternator.
Figure 24:
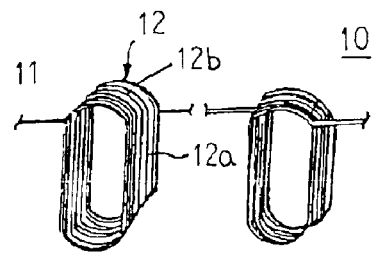
FIG. 24 is a diagram explaining the method for forming a stator winding in the conventional stator for an alternator.

FIG. 15 is a partial perspective showing part of a stator for an automotive alternator according to Embodiment 5 of the present invention, FIG. 16 is an end elevation explaining connections in a distributed winding phase portion in a stator winding of the stator for an automotive alternator according to Embodiment 5 of the present invention, FIG. 17 is a diagram explaining a method for manufacturing a winding assembly used in the stator winding of the stator for an automotive alternator according to Embodiment 5 of the present invention, FIG. 18 is another diagram explaining the method for manufacturing the winding assembly used in the stator winding of the stator for an automotive alternator according to Embodiment 5 of the present invention, FIG. 19A is another diagram explaining the method for manufacturing the winding assembly used in the stator winding of the stator for an automotive alternator according to Embodiment 5 of the present invention, FIG. 19B is another diagram explaining the method for manufacturing the winding assembly used in the stator winding of the stator for an automotive alternator according to Embodiment 5 of the present invention, FIG. 20 is a side elevation showing the winding assembly used in the stator winding of the stator for an automotive alternator according to Embodiment 5 of the present invention, FIG. 21 is a perspective explaining a winding construction of the winding assembly used in the stator winding of the stator for an automotive alternator according to Embodiment 5 of the present invention, FIG. 22A is a process cross section explaining a method for manufacturing the stator of the automotive alternator according to Embodiment 5 of the present invention, FIG. 22B is another process cross section explaining the method for manufacturing the stator of the automotive alternator according to Embodiment 5 of the present invention, and FIG. 22C is another process cross section explaining the method for manufacturing the stator of the automotive alternator according to Embodiment 5 of the present invention. Moreover, in FIG. 16, solid lines indicate connections at the first end of the stator core, broken lines indicate connections at the second end of the stator core, black dots indicate joint portions, and 1, 7, 13, etc., through 91 represent slot numbers.

In FIG. 15, a stator 50 is constituted by: a stator core 51 composed of a laminated core formed into a cylindrical shape, a plurality of slots 51c extending in an axial direction being formed in the stator core 51 at a predetermined pitch in a circumferential direction so as to open onto an inner circumferential side; a stator winding 52 formed by installing a plurality of continuous conductor wires in the slots 51c; and an insulator 53 mounted to each of the slots 51c.

The stator core 51 is provided with: an annular core back portion 51a; tooth portions 51b having a trapezoidal cross section each projecting radially inward from the core back portion 51a, the tooth portions 51b being disposed at a predetermined pitch in a circumferential direction; substantially rectangular slots 51c defined by adjacent pairs of the tooth portions 51b; and flange portions 51d projecting outward to first and second circumferential sides from tip portions of the tooth portions 51b. Moreover, this stator 50 applies to an automotive alternator mounted with a rotor in which the number of claw-shaped magnetic poles is sixteen, ninety-six slots 51c being formed in the stator core 51. In other words, the slots 51c are formed at a ratio of two per phase per pole.

The stator winding 52 is provided with a plurality of winding phase portions in each of which one conductor wire 60 is installed in a wave winding so as to fold over outside the slots 51c at first and second end surfaces of the stator core 51 and alternately occupy an inner layer and an outer layer in a slot depth direction in every sixth slot of the slots 51c.

Here, a copper wire material covered with an electrically-insulating coating is used for the conductor wires 60. Portions of the conductor wires 60 housed inside the slots 51c (slot-housed portions 60a) are formed with a rectangular cross section, and portions of the conductor wires 60 each connecting in series a slot-housed portion 60a in the inner layer in a first slot 51c and a slot-housed portion 60a in the outer layer in a second slot 51c six slots away at the first and the second end surfaces of the stator core 51 (coil end portions 60b) are formed with a circular cross section.

Next, a winding construction of a distributed winding phase portion 55 constituting the stator winding 52 will be explained in detail with reference to FIG. 16. Moreover, in each of the slots 51a, slot-housed portions of the conductor wires 60 are arranged in a single row in order of Address 1, Address 2, Address 3, and Address 4 from a radially-inner side.

The distributed winding phase portion 55 is constituted by first to fourth winding sub-portions 61 to 64 each composed of one conductor wire 60. The first winding sub-portion 61 is constructed by wave winding one conductor wire 60 into every sixth slot from Slot Numbers 1 to 91 so as to alternately occupy Address 1 and Address 2 in the slots 51c.

The second winding sub-portion 62 is constructed by wave winding a conductor wire 60 into every sixth slot from Slot Numbers 1 to 91 so as to alternately occupy Address 2 and Address 1 in the slots 51c. The third winding sub-portion 63 is constructed by wave winding a conductor wire 60 into every sixth slot from Slot Numbers 1 to 91 so as to alternately occupy Address 3 and Address 4 in the slots 51c. The fourth winding sub-portion 64 is constructed by wave winding a conductor wire 60 into every sixth slot from Slot Numbers 1 to 91 so as to alternately occupy Address 4 and Address 3 in the slots 51c. In each of the slots 51c, four slot housed portions 60a of the conductor wires 60 are arranged so as to line up in a single row in a radial direction with longitudinal axes of the rectangular cross sections thereof aligned radially.

At the first end surface of the stator core 51, a winding start end portion 62a of the second winding sub-portion 62 projecting from Address 2 of Slot Number 1 of the slots 51c and a winding finish end portion 64b of the fourth winding sub-portion 64 projecting from Address 3 of Slot Number 91 of the slots 51c are tungsten-inert gas (TIG) welded, and a winding start end portion 64a of the fourth winding sub-portion 64 projecting from Address 4 of Slot Number 1 of the slots 51c and a winding finish end portion 62b of the second winding sub-portion 62 projecting from Address 1 of Slot Number 91 of the slots 51c are TIG welded, forming a two-turn winding.

At the second end surface of the stator core 51, a winding start end portion 61a of the first winding sub-portion 61 projecting from Address 1 of Slot Number 1 of the slots 51c and a winding finish end portion 63b of the third winding sub-portion 63 projecting from Address 4 of Slot Number 91 of the slots 51c are TIG welded, and a winding start end portion 63a of the third winding sub-portion 63 projecting from Address 3 of Slot Number 1 of the slots 51c and a winding finish end portion 61b of the first winding sub-portion 61 projecting from Address 2 of Slot Number 91 of the slots 51c are TIG welded, forming a two-turn winding.

In addition, the coil end portion 60b of the conductor wire 60 of the third winding sub-portion 63 projecting at the first end surface of the stator core 51 from Address 3 of Slot Number 61 of the slots 51c and Address 4 of Slot Number 67 of the slots 51c is cut, and the coil end portion 60b of the conductor wire 60 of the fourth winding sub-portion 64 projecting at the first end surface of the stator core 51 from Address 3 of Slot Number 67 of the slots 51c and Address 4 of Slot Number 73 of the slots 51c is cut. A first cut end 63c of the third winding sub-portion 63 and a first cut end 64c of the fourth winding sub-portion 64 are joined together to form the four-turn distributed winding phase portion 55 in which the first to fourth winding sub-portions 61 to 64 are connected in series.

Moreover, a second cut end 63d of the third winding sub-portion 63 and a second cut end 64d of the fourth winding sub-portion 64 become an output wire (O) and a neutral point (N), respectively.

A total of six distributed winding phase portions 55 are formed in a similar manner by offsetting the slots 51c in which the conductor wires 60 are installed by one slot each.

Two three-phase alternating-current windings are each constructed by forming three of the distributed winding phase portions 55 into a Y connection, for example, to obtain the stator 50. Moreover, the two three-phase alternating current windings constitute the stator winding 52.

In the stator 50 constructed in this manner, the slot-housed portions 60a, which are formed with a rectangular cross section, are arranged so as to line up in single rows in a slot depth direction inside each of the slots 51c with the flat surfaces thereof brought into close contact with side wall surfaces of each of the slots 51c by means of the insulators 53.

In pairs of slots 51c separated by six slots, at a first axial end of the stator core 51, the slot-housed portions 60a housed in Address 1 and Address 2 of the pair of slots 51c are connected in series by a coil end portion 60b formed with a circular cross section, and the slot-housed portions 60a housed in Address 3 and Address 4 of the pair of slots 51c are connected in series by a coil end portion 60b. These two coil end portions 60b are arranged so as to be separated in a radial direction. Hence, the coil end portions 60b are arranged neatly in rows at a pitch of one slot in a circumferential direction so as to be separated from each other in a radial direction and a circumferential direction, constituting a coil end group 52r.

Similarly, in pairs of slots 51c separated by six slots, at a second axial end of the stator core 51, the slot-housed portions 60a housed in Address 1 and Address 2 of the pair of slots 51c are connected in series by a coil end portion 60b, and the slot-housed portions 60a housed in Address 3 and Address 4 of the pair of slots 51c are connected in series by a coil end portion 60b. These two coil end portions 60b are arranged so as to be separated in a radial direction. Hence, the coil end portions 60b are arranged neatly in rows at a pitch of one slot in a circumferential direction so as to be separated from each other in a radial direction and a circumferential direction, constituting a coil end group 52f.

In the coil end groups 52f and 52r, the conductor wires 60 projecting from any given slot 51c are distributed half each to first and second circumferential sides and lead into slots 51c six slots away on the first and second circumferential sides, respectively.

Consequently, similar effects to those in Embodiment 1 above can also be achieved in Embodiment 5 because the stator winding 52 is constituted by the distributed winding phase portions 55, the slot-housed portions 60a are formed with the rectangular cross section, and the coil end portions 60b are formed with a circular cross section. The space factor of the conductors in the slots 51c can be increased, thereby enabling an alternator having high output to be achieved.

Furthermore, according to Embodiment 5, reductions in the size of the stator 50 are enabled because alignment in rows and increased density of the coil end groups 52f and 52r are enabled.

Next, a method for manufacturing the stator 50 will be explained in detail with reference to FIGS. 17 to 22C.

First, twelve continuous conductor wires 65 are lined up at a pitch of one slot in a plane. Then, as shown in FIG. 17, the twelve conductor wires 65 are folded over together at a predetermined pitch (at the positions of the double-dotted chain lines), forming a beltlike winding unit 56 in which the twelve conductor wires 65 are wound into a helical shape so as to be inclined at an angle of α degrees relative to a center line L, as shown in FIG. 18. The conductor wires 65 are each composed of a copper wire material formed with a circular cross section covered with an electrically-insulating coating.

A first pair of pin groups 70 is inserted between the conductor wires 65 from a front side of the winding unit 56 at positions separated by a distance D in a width direction of the winding unit 56. Similarly, a second pair of pin groups 70 is inserted between the conductor wires 65 from a rear side of the winding unit 56 at positions separated by a distance D in a width direction of the winding unit 56. In addition, position-regulating pin groups 71 are inserted between the conductor wires 65 at edge portions in a width direction of the winding unit 56. Hence, the first, second, and position-regulating pin groups 70 and 71 are set as shown in FIG. 18. Here, the distance D substantially matches a groove length of slots 59c of a laminated body 59 described below (an axial length of the stator core 51).

Then, the pin groups 70 in the first pair of pin groups 70 inserted between the conductor wires 65 from the front side of the winding unit 56 are moved in mutually opposite directions in a longitudinal direction of the winding unit 56, as indicated by solid arrows in FIG. 18. Similarly, the pin groups 70 in the second pair of pin groups 70 inserted between the conductor wires 65 from the rear side of the winding unit 56 are moved in mutually opposite directions in the longitudinal direction of the winding unit 56, as indicated by broken arrows in FIG. 18. At this time, the conductor wires 65 are prevented from coming apart because the position-regulating pin groups 71 are inserted between the conductor wires 65.

Thus, the portions of the conductor wires 65 positioned between the pairs of pin groups 70 are deformed so as to become perpendicular to the longitudinal direction of the winding unit 56. Hence, straight portions 57a deformed so as to be perpendicular to the longitudinal direction of the winding unit 56 are superposed and form pairs in a front-to-back direction of the winding unit 56, ninety-six pairs being arranged at a pitch of one slot in the longitudinal direction of the winding unit 56. The portions of the conductor wires 65 positioned outside the pairs of pin groups 70 become linking portions linking straight portions 57a six slots apart. The beltlike winding unit 57 prepared in this manner is constructed into a winding construction equivalent to the winding assembly 58 shown in FIG. 20 described below except for the fact that the straight portions 57a have a circular cross section. In other words, the winding unit 57 is constructed such that the conductor wires 65 are formed into a pattern in which the straight portions 57a are disposed at a pitch of six slots and linked by the linking portions, and adjacent pairs of the straight portions 57a are alternately offset by a width (w) of the conductor wires 65 on a first and second side in the width direction by the linking portions, pairs of conductor wires 65 being formed by disposing two conductor wires 65 so as to be offset by a pitch of six slots from each other with straight portions 57a superposed, six pairs of conductor wires 65 being offset by a pitch of one slot from each other.

Next, the beltlike winding unit 57 is set in a press jig 72. As shown in FIGS. 19A and 19B, this press jig 72 is constituted by: a die 73 in which press grooves 74 are arranged at a pitch of one slot; and a press tool 75 on which press bars 75a are arranged at a pitch of one slot. The press grooves 74 are formed with a groove length substantially matching the groove length of the slots 59c of the laminated body 59 described below (the axial length of the stator core 51), and each is constituted by: a first press groove portion 74a having a groove width equivalent to the diameter of the conductor wires 65; and a second press groove portion 74b having a groove width which is narrower than the groove width of the first press groove portion 74a, the second press groove portion 74b being formed so as to follow on from the first press groove portion 74a. The press bars 75a have a length substantially matching the groove length of the press grooves 74 and a width substantially matching the groove width of the second press groove portions 74b.

Then, as shown in FIG. 19A, the beltlike winding unit 57 is set in the die 73 such that a pair of straight portions 57a is housed inside the first press groove portion 74a of each of the press grooves 74. Thereafter, the press tool 75 is set such that a press bar 75a is positioned inside the first press groove portion 74a of each of the press grooves 74, and the press tool 75 is moved downward in FIG. 19A.

Hence, the straight portion 57a of each of the pairs are pressed and are pushed from the first press groove portions 74a into the second press groove portions 74b while plastically deforming, eventually coming into contact with bottom portions of the second press groove portions 74b. The straight portions 57a of each of the pairs are pressed further by the press tool 75 to form slot-housed portions 60a having a rectangular cross section as shown in FIG. 19B. Thereafter, the press tool 75 is pulled out and the beltlike winding unit 57 is extracted from the die 73 to obtain the winding assembly 58 shown in FIG. 20.

The winding assembly 58 prepared in this manner is constructed such that ninety-six pairs of the slot-housed portions 60a which are superposed in a direction that is perpendicular to the surface of the page in FIG. 20 (corresponding to the thickness direction of the winding assembly 58) are arranged at a pitch of one slot and any given slot-housed portion 60a on a first side in the thickness direction in a first pair of the slot-housed portions 60a is linked by a coil end portion 60b to a slot-housed portion 60a on a second side in the thickness direction in a second pair of the slot-housed portions 60a six slots away. In other words, as shown in FIG. 21, conductor wires 60 are formed into a pattern in which the slot-housed portions 60a are disposed at a pitch of six slots and linked by the coil end portions 60b, and adjacent pairs of the slot-housed portions 60a are alternately offset by a width (w) of the conductor wires 60 on a first and second side in the width direction by the coil end portions 60b, pairs of conductor wires 60 being formed by disposing two conductor wires 60 so as to be offset by a pitch of six slots from each other with slot-housed portions 60a superposed. Six pairs of the conductor wires 60 constructed in this manner are arranged so as to be offset by a pitch of one slot from each other to constitute the winding assembly 58.

Next, as shown in FIG. 22A, an insulator 13 is mounted to each of the slots 59c of the laminated body 59. This laminated body 59 is formed into a rectangular parallelepiped by laminating and integrating a large number of pressed magnetic steel plates. Trapezoidal tooth portions 59b are formed at a predetermined pitch on one side of a core back portion 59a, flange portions 59d being formed on tip portions of each of the tooth portions 59b. Ninety-six slots 59c are formed. As shown in FIG. 22B, two winding assemblies 58 are stacked and mounted to the laminated body 59 from the opening ends of the slots 59c. Hence, the winding assemblies 58 are mounted to the laminated body 59 such that four slot-housed portions 60a are housed in each of the slots 59c so as to line up in a single row in a slot depth direction with the longitudinal axes of the rectangular cross sections thereof aligned in the slot depth direction.

Figure 25:
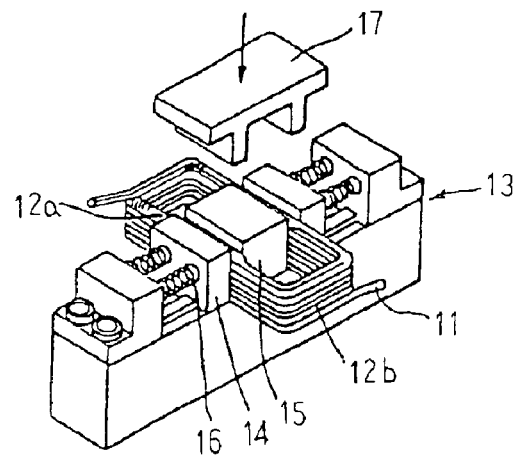
FIG. 25 is another diagram explaining the method for forming the stator winding in the conventional stator for an alternator.
Figure 26:
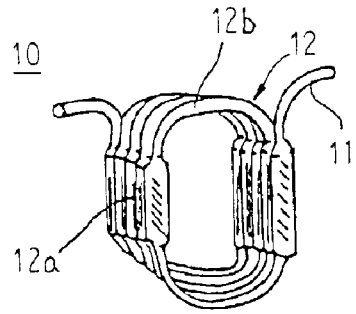
FIG. 26 is yet another diagram explaining the method for forming the stator winding in the conventional stator for an alternator.
Figure 27:
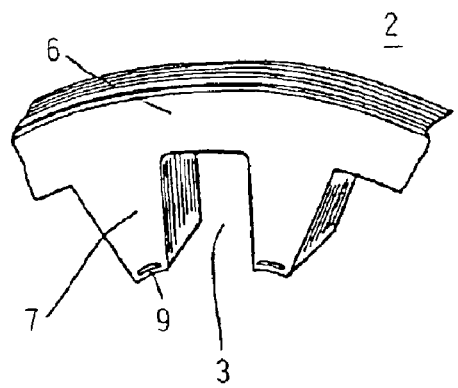
FIG. 27 is a perspective showing part of a stator core before installation of the stator winding in the conventional stator for an alternator.
Figure 28A:
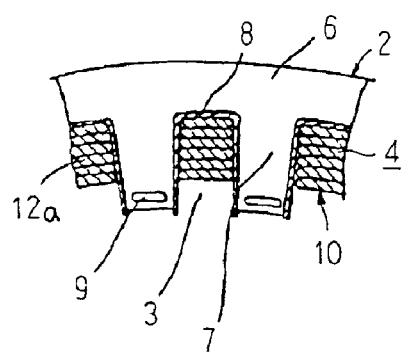
FIG. 28A is a diagram explaining a method for forming flange portions of the stator core in the conventional stator for an alternator.
Figure 28B:
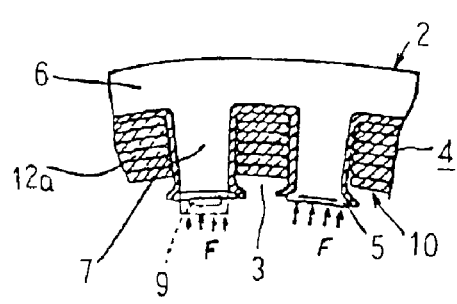
FIG. 28B is another diagram explaining the method for forming the flange portions of the stator core in the conventional stator for an alternator.

Thereafter, as shown in FIG. 25C, the laminated body 59 mounted with the two winding assemblies 58 is bent into an annular shape, first and second ends of the laminated body 59 bent into the annular shape are abutted, and the abutted portion is laser welded. The laminated body 59 integrated by welding the first and second ends thereof becomes the stator core 51.

The stator 50 is obtained by connecting the conductor wires 60 based on the connection method shown in FIG. 16.

Hence, similar effects to those in Embodiment 1 above can also be achieved in the method for manufacturing this stator 50 because the flange portions 51d are simultaneously formed at the stage when the laminated body 59 is prepared and the flange portions 51d can be formed by press forming.

The above embodiments have been explained for slot-housed portions formed with rectangular cross sections, but the slot-housed portions need only have a flat cross-sectional shape, and cross-sectional shapes such as rectangles, ovals, and bullet shapes can be used.

Furthermore, the coil end portions are explained as being formed with circular cross sections, but the coil end portions need only have an approximately circular cross-sectional shape, and cross-sectional shapes such as circles, ellipses, etc., can be used.

The present invention is constructed in the above manner and exhibits the effects described below.

According to one aspect of the present invention, there is provided a stator for an alternator including:

a stator core including:

an annular core back portion;

tooth portions each projecting radially inward from the core back portion, the tooth portions being disposed at a predetermined pitch in a circumferential direction;

slots defined by adjacent pairs of the tooth portions; and flange portions projecting to first and second circumferential sides from tip portions of the tooth portions; and stator winding composed of a plurality of winding phase portions each installed in the stator core in a slot group constituted by a group of the slots disposed at intervals of a predetermined number of slots, wherein each of the winding phase portions is constructed by installing a conductor wire in a distributed winding in the slot group so as to project from first and second ends of the slots, be distributed on first and second circumferential sides, and enter each of the slots the predetermined number of slots away on the first and second circumferential sides, each of slot-housed portions of the conductor wire housed in the slots is formed with a flat cross section, each of coil end portions of the conductor wire linking end portions of the slot-housed portions is formed with a substantially circular cross section, and the slot-housed portions are housed inside each of the slots in a plurality of layers so as to be arranged in at least a single row in a radial direction, enabling improvements in space factor, thereby enabling an alternator having high output to be achieved, and also suppressing damage to an electrically-insulating coating resulting from rubbing among the coil end portions and suppressing damage to the electrically-insulating coating resulting from bending stresses arising due to contact among the coil end portions, thereby providing a stator for an alternator having superior electrical insulation.

A circumferential width of the slot-housed portions may substantially match a circumferential width of the slots, the slot-housed portions being housed inside the slots so as to be stacked in a radial direction and arranged in a single row, suppressing displacement of the slot-housed portions inside the slots accompanying vibration, thereby improving electrical insulation.

The slot-housed portions may be formed such that the circumferential width thereof is larger than a width of an opening of the slots, preventing dislodgment of the slot-housed portions.

The slots may be formed into a substantially trapezoidal shape tapering radially inward, and the slot-housed portions arranged inside the slots in a radial direction are formed such that the flatness ratio of each slot-housed portion decreases sequentially from an outer radial side to an inner radial side decreases so as to conform the slot-housed portions conform to the substantially trapezoidal shape of the slots, reliably suppressing displacement of the slot-housed portions inside the slots accompanying vibration, thereby further improving electrical insulation.

The conductor wire may include slot-opening passing portions having a flat cross-sectional shape formed at a boundary portion between the slot-housed portions and the coil end portions at a first axial end of the stator core, the slot-opening passing portions being disposed such that longitudinal axes of the cross sections thereof are substantially aligned in a radial direction, and the slot-opening passing portions being formed such that a circumferential width thereof is smaller than a width of an opening of the slots, enabling contact between the stator winding and the stator core to be reduced during mounting of the stator winding into the stator core.

The slots may be formed at a ratio of a plural number per phase per pole, narrowing the shape of the slots, thereby enabling reductions in the size of the flatness ratio of the slot-housed portions. As a result, the occurrence of damage to the electrically-insulating coating when the slot-housed portions are given flat cross sections is suppressed.

An electrically-insulating resin may be applied to a coil end group constituted by the coil end portions of the plurality of winding phase portions, eliminating rubbing among the coil end portions, thereby improving electrical insulation.

According to another aspect of the present invention, there is provided a method for manufacturing a stator for an alternator, the stator including:

a stator core including:

an annular core back portion;

tooth portions each projecting radially inward from the core back portion, the tooth portions being disposed at a predetermined pitch in a circumferential direction;

slots defined by adjacent pairs of the tooth portions; and flange portions projecting to first and second circumferential sides from tip portions of the tooth portions; and stator winding composed of a plurality of distributed winding phase portions each installed in the stator core in a slot group constituted by a group of the slots disposed at intervals of a predetermined number of slots, the method including steps of:

preparing the stator core by laminating and integrating a magnetic steel sheet;

preparing an annular winding unit by winding a conductor wire formed with a substantially circular cross section into a ring shape for a predetermined number of winds;

preparing a star-shaped winding unit by bending the annular winding unit into a star-shaped pattern such that straight slot-housed portions are arranged at a predetermined slot pitch in a circumferential direction with a longitudinal direction thereof substantially aligned in a radial direction, end portions of slot-housed portions separated by the predetermined slot pitch in approximately half of the slot-housed portions are alternately linked on an inner circumferential side and an outer circumferential side by first U-shaped coil end portions, end portions of slot-housed portions separated by the predetermined slot pitch in a remainder of the slot-housed portions are alternately linked on an inner circumferential side and an outer circumferential side by second U-shaped coil end portions, and the first coil end portions linking the end portions of approximately half of the slot-housed portions and the second coil end portions linking the end portions of the remainder of the slot-housed portions face each other in a radial direction;

plastically deforming the slot-housed portions of the star-shaped winding unit into a flat cross section;

preparing a cylindrical distributed winding unit by reshaping the star-shaped winding unit such that the slot-housed portions are arranged at the predetermined slot pitch in a circumferential direction with a longitudinal direction thereof parallel to an axial direction; and mounting the distributed winding unit into the stator core from an axial direction by inserting the slot-housed portions inside the slots while passing a portion of the coil end portions at a first axial end of the distributed winding unit between the flange portions constituting slot openings, enabling a stator having a high space factor and superior electrical insulation to be achieved, and also providing a stator for an alternator enabling the shape of the tips of the tooth portions to be formed with high dimensional precision.

There may be further included the step of bending the coil end portions at the first axial end of the distributed winding unit radially inward before the step of mounting the distributed winding unit into the stator core, facilitating mounting of the distributed winding unit to the stator core.

There may be further included the step of forming slot-opening passing portions having a flat cross section by plastically deforming the coil end portions in a vicinity of the slot-housed portions at the first axial end of the distributed winding unit before the step of mounting the distributed winding unit into the stator core, reducing contact between the conductor wires and the stator core during mounting of the distributed winding unit to the stator core, thereby suppressing electrically-insulating degradation resulting from damage to the electrically-insulating coating.

All of the slot-housed portions constituting the star-shaped winding unit may be press formed simultaneously in the step of plastically deforming the slot-housed portions of the star-shaped winding unit into the flat cross section, simplifying the manufacturing process, thereby shortening manufacturing time.

The slot-housed portions of the star-shaped winding unit constituting the slot-housed portions of the distributed winding unit may be mounted into each of the slots so as to align in layers in a radial direction of the slots in the step of mounting the distributed winding unit into the stator core, and the slot-housed portions of the star-shaped winding unit may be press formed layer by layer in the step of plastically deforming the slot-housed portions of the star-shaped winding unit into the flat cross section, the slot-housed portions of the star-shaped winding unit in each respective layer being press formed simultaneously, enabling the cross-sectional shape of the slot-housed portions to be easily formed so as to conform to the shape of the slots.

A plurality of the distributed winding units constituting the stator winding may be stacked concentrically so as to offset the slot-housed portions in each distributed winding unit by a pitch of one slot in a circumferential direction and be mounted into the stator core simultaneously in the step of mounting the distributed winding unit into the stator core, simplifying the manufacturing process, thereby shortening manufacturing time.

What is claimed is:

1. A stator for an alternator, comprising:
    a stator core comprising:
        an annular core back portion;
        tooth portions each projecting radially inward from said core back portion, said tooth portions being disposed at a predetermined pitch in a circumferential direction;
        slots defined by adjacent pairs of said tooth portions; and
        flange portions projecting to first and second circumferential sides from tip portions of said tooth portions; and stator winding composed of a plurality of winding phase portions each installed in said stator core in a slot group constituted by a group of said slots disposed at intervals of a predetermined number of slots,
    wherein each of said winding phase portions is constructed by installing a conductor wire in a distributed winding in said slot group so as to project from first and second ends of said slots, be distributed on first and second circumferential sides, and enter each of said slots said predetermined number of slots away on said first and second circumferential sides,
    each of slot-housed portions of said conductor wire housed in said slots is formed with a flat cross section,
    each of coil end portions of said conductor wire linking end portions of said slot-housed portions is formed with a substantially circular cross section, and slot-opening passing portions having a flat cross-sectional shape formed at a boundary portion between said slot-housed portions and said coil end portions, said slot-opening passing portions having a width which is narrower than a width of the slot-housed portions, and
    said slot-housed portions are housed inside each of said slots in a plurality of layers so as to be arranged in at least a single row in a radial direction.

2. The stator for an alternator according to claim 1 wherein a circumferential width of said slot-housed portions substantially matches a circumferential width of said slots, said slot-housed portions being housed inside said slots so as to be stacked in a radial direction and arranged in a single row.

3. The stator for an alternator according to claim 2 wherein said slot-housed portions are formed such that said circumferential width thereof is larger than a width of an opening of said slots.

4. The stator for an alternator according to claim 1 wherein said slots are formed into a substantially trapezoidal shape tapering radially inward, and said slot-housed portions arranged inside said slots in a radial direction are formed such that the flatness ratio of each slot-housed portion decreases sequentially from an outer radial side to an inner radial side so as to conform said slot-housed portions to said substantially trapezoidal shape of said slots.

5. The stator for an alternator according to claim 1 wherein said slot-opening passing portions are formed at a first axial end of said stator core, said slot-opening passing portions being disposed such that longitudinal axes of the cross sections thereof are substantially aligned in a radial direction, and said slot-opening passing portions being formed such that a circumferential width thereof is smaller than a width of an opening of said slots.

6. The stator for an alternator according to claim 1 wherein said slots are formed at a ratio of a plural number per phase per pole.

7. The stator for an alternator according to claim 1 wherein an electrically-insulating resin is applied to a coil end group constituted by said coil end portions of said plurality of winding phase portions.

8. A stator for an alternator, comprising:
    a stator core comprising:
        an annular core back portion;
        tooth portions each projecting radially inward from said core back portion, said tooth portions being disposed at a predetermined pitch in a circumferential direction;
        slots defined by adjacent pairs of said tooth portions; and flange portions projecting to first and second circumferential sides from tip portions of said tooth portions; and stator winding composed of a plurality of winding phase portions each installed in said stator core in a slot group constituted by a group of said slots disposed at intervals of a predetermined number of slots, wherein each of said winding phase portions is constructed by installing a conductor wire in a distributed winding in said slot group so as to project from first and second ends of said slots, be distributed on first and second circumferential sides, and enter each of said slots said predetermined number of slots away on said first and second circumferential sides, each of slot-housed portions of said conductor wire housed in said slots is formed with a flat cross section, each of coil end portions of said conductor wire linking end portions of said slot-housed portions is formed with a substantially circular cross section, said slot-housed portions are housed inside each of said slots in a plurality of layers so as to be arranged in at least a single row in a radial direction, and wherein said conductor wire comprises slot-opening passing portions having a flat cross-sectional shape formed at a boundary portion between said slot-housed portions and said coil end portions at a first axial end of said stator core, said slot-opening passing portions being disposed such that longitudinal axes of the cross sections thereof are substantially aligned in a radial direction, and said slot-opening passing portions being formed such that a circumferential width thereof is smaller than a width of an opening of said slots.

* * * * *